(12) United States Patent
Kawasaki

(10) Patent No.: US 7,873,096 B2
(45) Date of Patent: Jan. 18, 2011

(54) FREQUENCY-DIVISION MULTIPLEXING TRANSCEIVER APPARATUS, WAVE-NUMBER-DIVISION MULTIPLEXING TRANSCEIVER APPARATUS AND METHOD THEREOF

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/616,238

(22) Filed: Nov. 11, 2009

(65) Prior Publication Data

US 2010/0103984 A1 Apr. 29, 2010

Related U.S. Application Data

(62) Division of application No. 11/486,262, filed on Jul. 13, 2006, now Pat. No. 7,684,463.

(30) Foreign Application Priority Data

Mar. 15, 2006 (JP) .............................. 2006-070152

(51) Int. Cl.
  *H04B 1/00* (2006.01)
(52) U.S. Cl. ....................... 375/146; 375/135; 370/204; 370/206; 370/208; 370/209
(58) Field of Classification Search ................. 375/135, 375/146; 370/203–211
See application file for complete search history.

(56) References Cited

U.S. PATENT DOCUMENTS

| | | | | |
|---|---|---|---|---|
| 7,003,045 B2 * | 2/2006 | Morgan et al. | ............... | 375/265 |
| 2004/0156386 A1 | 8/2004 | Atarashi et al. | | |
| 2005/0276242 A1 | 12/2005 | Goto et al. | | |

2006/0002451 A1 1/2006 Fukuta et al.

FOREIGN PATENT DOCUMENTS

| | | |
|---|---|---|
| EP | 1445873 A2 | 8/2004 |
| JP | 11-266224 | 9/1999 |

(Continued)

OTHER PUBLICATIONS

Extended European Search Report issued by European Patent Office, dated Apr. 7, 2010, in the corresponding European Patent Application No. 06253728.

(Continued)

*Primary Examiner*—Curtis B Odom
(74) *Attorney, Agent, or Firm*—Katten Muchin Rosenman LLP

(57) ABSTRACT

A frequency-division multiplexing transmission apparatus for transmitting data in a frequency spectrum specific to both symbol and mobile station, is disclosed. The apparatus encodes transmission data, modulates the encoded data, compresses the time domains of each symbol of the modulated transmission-symbol sequence, repeats the symbols a specified number of times, rearranges each of the symbols of the obtained repetitive-symbol sequence so that they have the same arrangement as the transmission-symbol sequence, generates each phase that changes at a speed specific to each symbol of the transmission-symbol sequence, performs phase rotation specific to the symbols for each symbol of the rearranged repetitive-symbol sequence, generates phase that changes at a speed specific to a mobile station, performs phase rotation specific to the mobile station for the symbol sequence for which the phase rotation was performed, and transmits the phase-rotated symbol sequence.

6 Claims, 20 Drawing Sheets

FOREIGN PATENT DOCUMENTS

WO    2006/007292    1/2006

OTHER PUBLICATIONS

Osamu Takyu et al: "Frequency rotation for suppression path interference and achieving large frequency diversity in uplink IFDMA" Personal, Indoor and Mobile Radio Communications, 2008. PIMRC 2008. IEEE 19th International Symposium on, IEEE, Piscataway, NJ, USA, Sep. 15, 2008, pp. 1-5, XP031371622, the whole document.

Goto et al.: "Investigations on packet error rate of variable spreading and chip repetition factors (VSCRF)-CDMA wireless access in reverse link multi-cell environment" IEEE Vehicular Technology Conference, vol. 2, Sep. 26, 2004, pp. 944-948, XP010786761, Piscataway, US, abstract.

Non-final Office Action dated Mar. 31, 2009 from corresponding U.S. Appl. No. 11/486,262.

Schnell, et al., "Application of IFDMA to mobile radio transmission", Oct. 1998, IEEE 1998 International Conference on Universal Personal Communications, 1998, ICUPC 1998, vol. 2, pp. 1267-1272.

Notification of Reasons for Refusal dated Aug. 31, 2010, from the corresponding Japanese Application.

"Distributed Resource Allocation for OFDMA" 3GPP TSG WG1#43, RI-051418, Oct. 31, 2005, retrieved from http://www.3gpp.org/ftp/tsg_ran/WG1_RL1/TSGR1_43/Docs/R1-051418.zip.

* cited by examiner

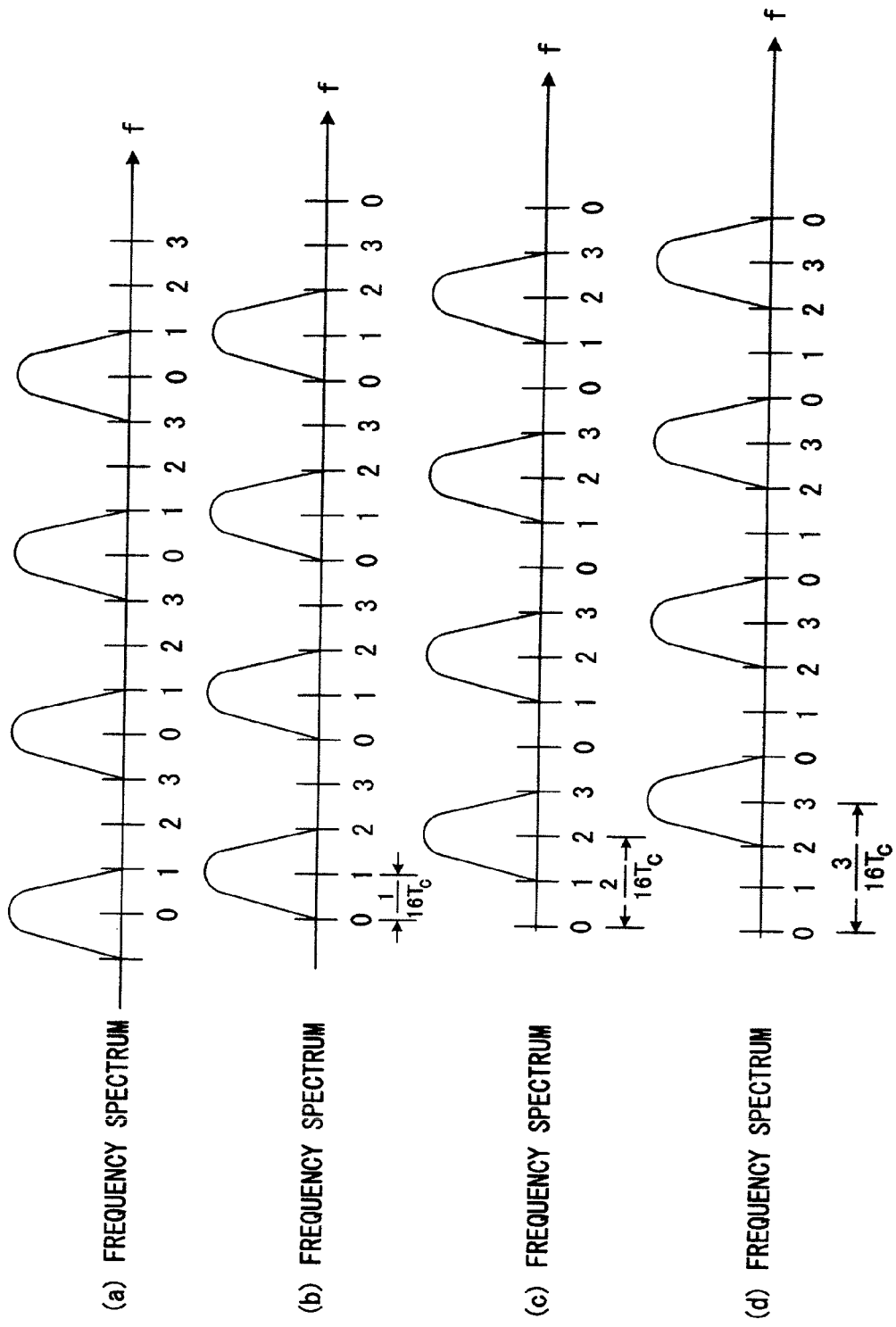

FREQUENCY-DIVISION MULTIPLEXING TRANSCEIVER APPARATUS, WAVE-NUMBER-DIVISION MULTIPLEXING TRANSCEIVER APPARATUS AND METHOD THEREOF

BACKGROUND OF THE INVENTION

This invention relates to a frequency-division multiplexing transceiver apparatus, wave-number-division multiplexing transceiver apparatus and method thereof, and more particularly to a frequency-division multiplexing transceiver apparatus, wave-number-division multiplexing transceiver apparatus and method for transmitting data in a frequency spectrum or wave-number spectrum.

DS-CDMA (Direct Sequence-Code Division Multiple Access) multiplies a narrow-band transmission signal by a spreading code in order to spread and transmit that transmission signal over a wider band. In DS-CDMA, when each of a plurality of mobile stations sends a transmission signal upon multiplying it by a spreading code having a certain spreading factor SF, the information transmission speed becomes 1/SF. Therefore, in order to achieve a frequency utilization efficiency that is equivalent to that of TDMA, it is necessary in DS-CDMA to accommodate a number of signals that is equal to SF number of mobile stations. However, in an actual wireless propagation environment on the uplink, the effect of Multiple Access Interference (MAI), in which the signals from each of the mobile stations interfere with each other, becomes dominant due to differences in propagation conditions from each mobile station to the base station, for example, due to differences in propagation-delay time or propagation-path fluctuation, and thus the rate of frequency utilization decreases.

Therefore, IFDMA (Interleaved Frequency Division Multiple Access) is being studied as a wireless modulation method that is capable of reducing the effects of MAI in next-generation mobile communications (see the specification of JP2004-297756A, and Goto, et al., "Investigations on Packet Error Rate of Variable Spreading and Chip Repetition Factors (VSCRF)-CDMA Wireless Access in Reverse Link Multi-cell Environment", The Institute of Electronics, Information and Communication Engineers, Technical Report of IEICE, RCS2004-84 (204-206). This IFDMA modulation method transmits a transmission signal upon multiplying the signal by a phase that changes at a speed specific to the mobile station, thereby reducing MAI by placing the signals from each of the mobile stations on a frequency axis in such a manner that the signals will not overlap each other on the frequency axis.

FIG. 21 is a block diagram showing the structure of a mobile station that uses an IFDMA modulation method, and FIG. 22 is a drawing that explains an IFDMA symbol. A channel encoder $1a$ performs channel encoding by applying error-correction encoding such as turbo encoding or convolutional encoding to an entered binary information sequence, and a data modulator $1b$ converts the channel-encoded data to I, Q complex components (symbols) in QPSK, for example. A symbol transmitted in one frame of IFDMA is referred to as an "IFDMA symbol", and one IFDMA symbol is composed of Q-number of symbols S0, S1, S2, S3 as shown in (a) of FIG. 22 (Q=4 in the figure).

A symbol-repetition-and-rearrangement unit $1c$ compresses the time domains of the four symbols S0, S1, S2 and S3 of the IFDMA symbol, and repeatedly generates each symbol L times (L=4 in the figure), as well as rearranges the repeatedly generated symbols and places them in the same arrangement as that of the symbol sequence S0, S1, S2, S3 (see (b) of FIG. 22). By taking Tc to be the sample period, the period Ts of symbol repetition will satisfy the relation Ts=Tc×Q. A phase-rotation unit $1d$ has a complex multiplier CML that performs mobile-station specific phase rotation for each symbol in the repetitive symbol sequence (see (c) of FIG. 22), and a wireless transmitter $1e$ performs up-conversion of the signal that is input from the phase-rotation unit $1d$ from baseband frequency to radio frequency, after which it amplifies the signal and transmits it from an antenna.

When the time domains of the transmission-symbol sequence S0, S1, S2, S3 are compressed and each transmission symbol is repeatedly generated a prescribed number of times (L times), and each of the symbols of the repetitive-symbol sequence are rearranged so as to have the same arrangement as that of the symbol sequence S0, S1, S2, S3, the repetitive-symbol sequence after rearrangement will have a comb-tooth-shaped frequency spectrum as shown in (a) of FIG. 23. Also, by performing phase rotation that varies at a speed that is specific to the mobile station for each of the symbols of the rearranged repetitive-symbol sequence, the spectral positions of the comb-tooth-shaped frequency spectrum shift as shown in (a) to (d) of FIG. 23, and frequency-division multiplex transmission becomes possible. In other words, when the speed of phase rotation is zero, the frequency spectrum of the output signal from the phase-rotation unit $1d$ will have comb-tooth-shaped frequency spectrum characteristics as shown in (a) of FIG. 23, and as the amount of change in the phase rotation per unit time Tc increases, the frequency spectrum will shift as shown in (a) to (d) of FIG. 23.

An NCO (Numerically Controlled Oscillator) $1g$ calculates the amount of phase rotation θ per unit time Tc, and the complex multiplier of the phase-rotation unit $1d$ performs phase rotation specific to the mobile station for each symbol of the repetitive-symbol sequence and executes frequency shift processing.

In a case where Q-number of symbols are repeated L times, the phase $\theta_k(t)$ that is output from the NCO $1g$ is given by the following equation:

$$\theta_k(t) = k \cdot 2\pi \frac{W}{L} \cdot \tilde{t} = k \cdot 2\pi \frac{1}{L \cdot Q \cdot Tc} \cdot t \qquad (1)$$

$$W = \frac{1}{Ts}$$

$$QW = \frac{1}{Tc}$$

where W is the symbol frequency, and k is a value that corresponds to the mobile station and is any one value among 0, 1, 2, ... L−1. NCO $1g$ outputs the phase $\theta_k(t)$, which has been calculated according to Equation (1), at the period Tc, and is so adapted that the amount of phase rotation will be 2π at the IFDMA period (=L·Q·Tc=16Tc) (such that the phase will make one full cycle).

In NCO $1g$, a frequency-shift-setting unit $1h$ sets the amount Δω of change of phase rotation (angular speed) per unit time Tc. That is, using the parameters k, L and Q, the unit $1h$ calculates and outputs the angular speed Δω according to the following equations:

$$\Delta\omega = k \cdot 2\pi \frac{W}{L} = k \cdot 2\pi \frac{2}{L \cdot Q} \qquad (2)$$

-continued $$f = \frac{\Delta\omega}{2\pi \cdot Tc} = \frac{k}{L \cdot Q \cdot Tc}$$

A rotation-phase-amount-setting unit $1i$ comprises an adder ADD and a delay unit DLY for applying a delay time T (=Tc), and performs a calculation according to the following equation every unit time Tc to increase the rotation phase $\theta$ by $\Delta\omega$ at a time and outputs the result.

$$\theta = \theta + \Delta\omega \quad (2a)$$

A converter $1j$ calculates I, Q components (x, y) in a complex plane of the rotation phase amount $\theta$ and inputs these components to the phase-rotation unit $1d$. By taking the symbols of the repetitive-symbol sequence to be S (=X+jY), the phase-rotation unit $1d$ performs a calculation according to the following equation and outputs the calculation result.

$$(X+jY) \cdot (x+jy)$$

In actuality, the complex multiplier CML of the phase-rotation unit $1d$ calculates and outputs (Xx−Yy) and (Xy+Yx) for each real-number and imaginary-number part.

If k=0, the amount of phase shift will be zero ($\Delta\omega$=0), and the frequency spectrum will become as shown in (a) of FIG. 23. If k=1, the amount of phase shift will become $\Delta\omega$=2$\pi$/L×Q according to Equation (2), and if Q=L=4, then the phase will change in increments of $\pi$/8 and the frequency spectrum will become as shown in (b) of FIG. 23. Also, if k=2, the amount of phase shift will become $\Delta\omega$=4$\pi$/L×Q according to Equation (2), If Q=L=4, then the phase will change in increments of 2$\pi$/8 for each Tc, and the frequency spectrum will become as shown in (c) of FIG. 23. Moreover, if k=3, then the amount of phase shift will become $\Delta\omega$=6$\pi$/L×Q according to Equation (2). If Q=L=4, then the phase will change in increments of 3$\pi$/8 for each Tc, and the frequency spectrum will become as shown in (d) of FIG. 23. As a result, even when a plurality of mobile stations access the same base station simultaneously, the frequency spectrum of each mobile station will be orthogonal on the frequency axis, and it is possible to reduce interference among transmission signals.

In mobile wireless communication, depending on the propagation path, MPI (Multi-Path Interference) occurs, and line quality becomes poor. Therefore, in prior IFDMA, in order to reduce MPI as explained in paragraphs [0010] to [0014] of JP2004-297756A, a multi-path interference canceller is used. However, in the method of using this multi-path interference canceller, the amount of processing necessary increases, and there is a problem with traceability.

Therefore, an OFDM method that is capable of lowering the effect of MPI is being studied as a modulation method. However, in the OFDM method, transmission symbols are multiplexed on orthogonal frequencies, so the Peak to Average Power Ratio (PAPR) becomes large and the transmission efficiency of the transmission amplifier becomes poor. In order to prevent the PAPR from increasing, a single portion that is greater than a threshold value is deleted by a clipping process in the transmission unit in order to suppress peak power, and this makes it possible to reduce the peak power that is input to the transmission amplifier. However, there is a problem in that there is an increase in the rate of code errors due to suppression of the peak power.

SUMMARY OF THE INVENTION

The object of the present invention is to reduce multi-path interference without using a multi-path canceller.

In OFDM, there is a tendency for PAPR to become large due to multiplexing. Therefore, another object of the present invention is to prevent that PAPR from becoming large.

A first form of the present invention is a frequency-division multiplexing transmission apparatus that transmits data in a frequency spectrum specific to both symbol and mobile station.

A first frequency-division multiplexing transmission apparatus of the first form of the invention comprises: an encoder for encoding transmission data; a data-modulation unit for modulating output data from the encoder; a time-domain compression and repetition unit for compressing the time domains of each symbol of the transmission-symbol sequence that is output from the modulation unit, and repeating the symbols a specified number of times; a symbol-rearrangement unit for rearranging each of the symbols of the obtained repetitive-symbol sequence so that they have the same arrangement as the transmission-symbol sequence; a first phase-generation unit for generating each phase that respectively changes at a speed specific to each symbol of the transmission symbol sequence; a first phase-rotation unit for performing phase rotation specific to the symbols for each symbol of the rearranged repetitive-symbol sequence; a second phase-generation unit for generating phase that changes at a speed specific to a mobile station; a second phase-rotation unit for performing phase rotation specific to the mobile station for the symbol sequence that is output from the first phase-rotation unit; and a transmission unit for transmitting the output from the second phase-rotation unit.

A second frequency-division multiplexing transmission apparatus of the first form of the present invention comprises: an encoder for encoding transmission data; a data-modulation unit for modulating output data from the encoder; a time-domain compression and repetition unit for compressing the time domains of each symbol of the transmission-symbol sequence that is output from the modulation unit, and repeating the symbols a specified number of times; a symbol-rearrangement unit for rearranging each of the symbols of the obtained repetitive-symbol sequence so that they have the same arrangement as the transmission-symbol sequence; a phase-generation unit for generating each phase that changes at a speed specific to each symbol of the transmission-symbol sequence and mobile station; a phase-rotation unit for performing phase rotation of the phase that is output from the phase-generation unit for each symbol of the rearranged repetitive-symbol sequence; and a transmission unit for transmitting the output from the phase-rotation unit.

A third frequency-division multiplexing transmission apparatus of the first form of the present invention comprises: an encoder for encoding transmission data; a data-modulation unit for modulating output data from the encoder; a time-domain compression and repetition unit for compressing the time domains of each symbol of the transmission-symbol sequence that is output from the modulation unit, and repeating the symbols a specified number of times; a symbol-rearrangement unit for rearranging each of the symbols of the obtained repetitive-symbol sequence so that they have the same arrangement as the transmission-symbol sequence; a phase-generation unit for generating each phase that changes at a speed specific to each symbol of the transmission-symbol sequence; a phase-rotation unit for performing phase rotation specific to the symbols for each symbol of the rearranged repetitive-symbol sequence; and a transmission unit for transmitting the output from the phase-rotation unit.

A frequency-division multiplexing receiving apparatus of this first form of the invention comprises: a receiving unit for receiving signals transmitted from the transmission apparatus; an orthogonal-demodulation unit for demodulating each of the symbols of the repetitive-symbol sequence from the received signal; a timing-detection unit for detecting the frame-symbol timing of the received symbol sequence; an FFT processing unit for selecting the received symbol sequence at the timing detected by the timing-detection unit, then performing FFT conversion of the received symbol sequence and converting it to a frequency spectrum; a combiner for combining the frequency spectra specific to the symbol of the transmission-symbol sequence and the mobile station for each mobile station and symbol; and a decoder for decoding data from the combined signal of each symbol.

A second form of the present invention is a wave-number-division multiplexing transmission apparatus that transmits data in a wave-number spectrum specific to both symbol and mobile station.

This wave-number-division multiplexing transmission apparatus comprises: an encoder for encoding transmission data; a data-modulation unit for modulating output data from the encoder; a time-domain compression and repetition unit for compressing the time domains of each symbol of the transmission-symbol sequence that is output from the modulation unit, and repeating the symbols a specified number of times; a symbol-rearrangement unit for rearranging each of the symbols of the obtained repetitive-symbol sequence so that they have the same arrangement as the transmission-symbol sequence; a spreading-code-generation unit for generating specified wave number code that makes up Walsh code as spreading code for each symbol of the repetitive-symbol sequence; a spreading unit for multiplying each symbol of the repetitive-symbol sequence with the spreading code to spread the symbols; and a transmission unit for transmitting the output from the spreading unit.

A wave-number-division multiplexing receiving apparatus of this second form of the invention comprises: a receiving unit for receiving signals transmitted from the transmission apparatus; an orthogonal-demodulation unit for demodulating each of the symbols of the repetitive-symbol sequence from the received signal; a timing-detection unit for detecting frame-symbol timing of the received symbol sequence; a Walsh WFT processing unit for selecting the received symbol sequence at the timing detected by the timing-detection unit, and performing Walsh WFT conversion of the received symbol sequence to convert it to a wave-number spectrum; a combiner for combining the wave-number spectra specific to the symbol of the transmission-symbol sequence and the mobile station for each mobile station and symbol; and a decoder for decoding the data from the combined signals of each symbol.

A third form of the present invention is a frequency-division multiplexing transmission method and a wave-number-division multiplexing transmission method.

The frequency-division multiplexing transmission method of this third form of the invention comprises steps of executing each part of the frequency-division multiplexing transmission apparatus described above. Also, the wave-number-division multiplexing transmission method comprises steps of executing each part of the wave-number-division multiplexing transmission apparatus described above.

With this invention, it is possible to perform transmission using a pseudo-like OFDM method without using a multi-path canceller, so it is possible to reduce multi-path interference (MPI) the same as in the OFDM method, thus resulting in a frequency diversity effect.

Moreover, with this invention, symbol is transmitted in orthogonal frequencies or wave numbers, so spread gain is obtained, and it is possible to reduce PAPR.

Other features and advantages of the present invention will be apparent from the following description taken in conjunction with the accompanying drawings.

BRIEF DESCRIPTION OF THE DRAWINGS

FIG. 23 is a drawing explaining a comb-tooth-shaped frequency spectrum.

DESCRIPTION OF THE PREFERRED EMBODIMENTS

Figure 1:
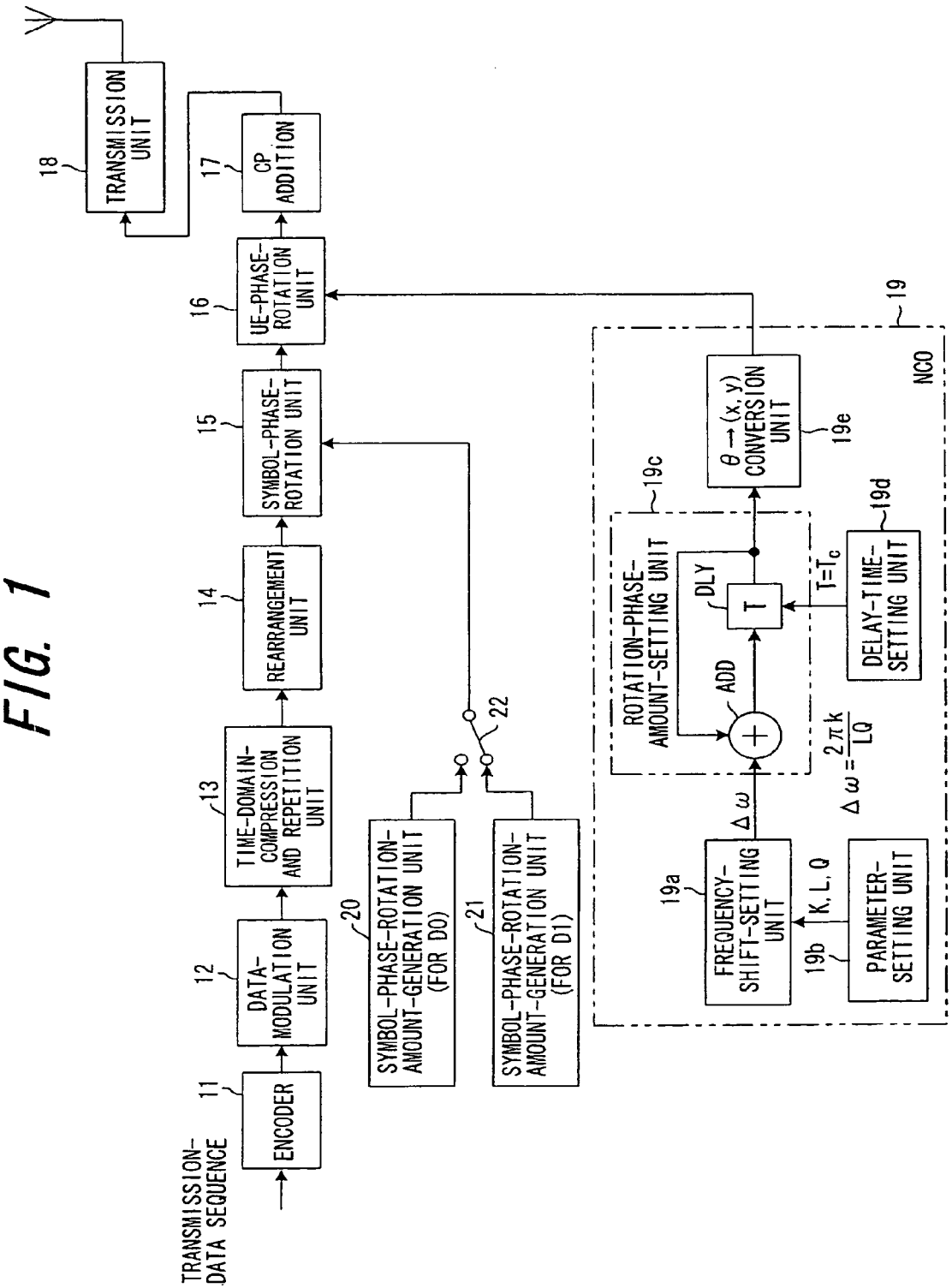
FIG. 1 is a block diagram of a frequency-division multiplexing transmission apparatus of a first embodiment of the invention.
Figure 2:
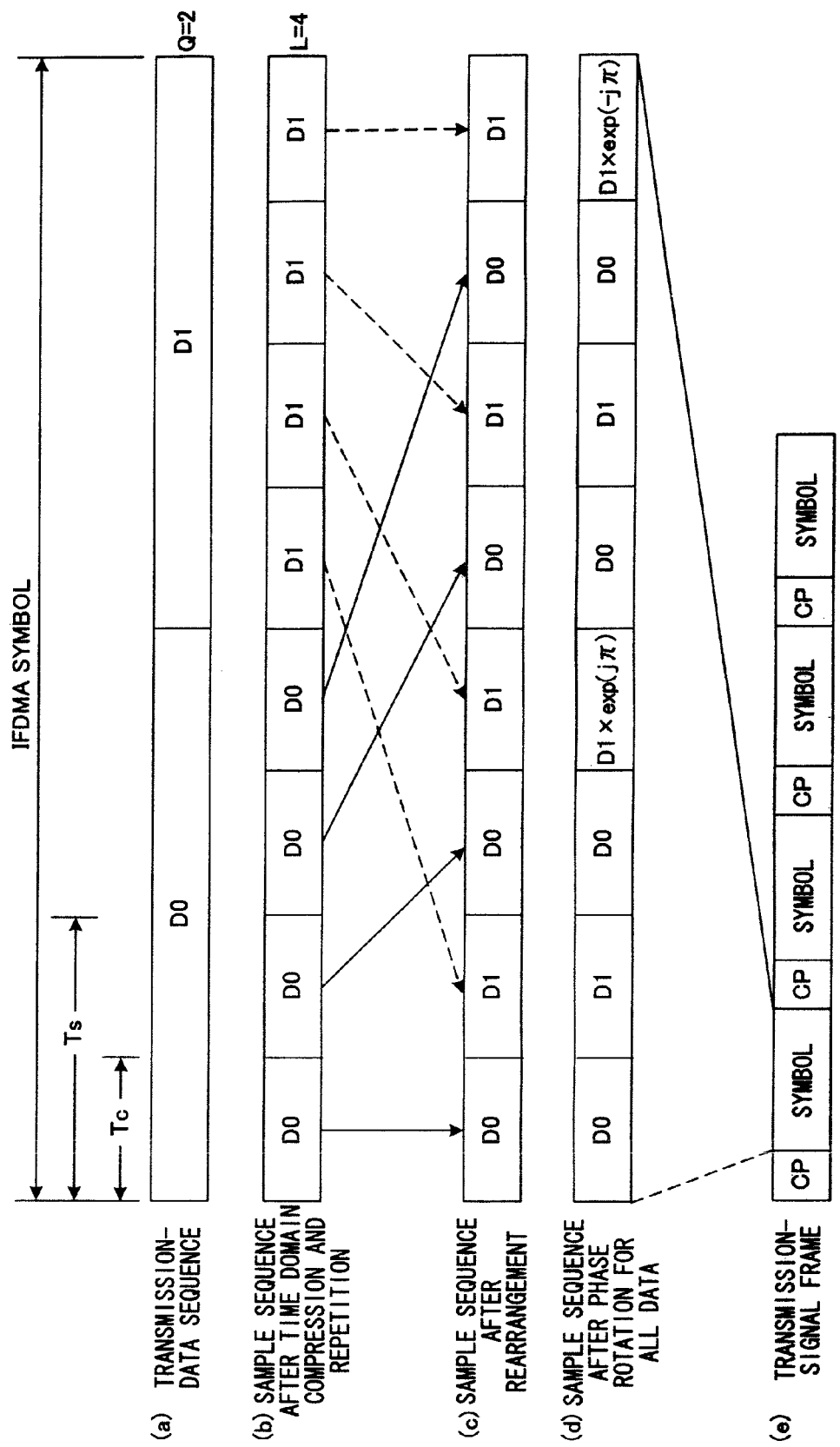
FIG. 2 is a timing chart for explaining the operation of the frequency-division multiplexing transmission apparatus shown in FIG. 1.

(A) First Embodiment (a) Frequency-Division Multiplexing Transmission Apparatus FIG. 1 is a block diagram showing a frequency-division multiplexing transmission apparatus of a first embodiment of the invention. FIG. 2 is a timing chart for explaining the operation of the frequency-division multiplexing transmission apparatus shown in FIG. 1. The frequency-division multiplexing transmission apparatus of this first embodiment can be used as a mobile station.

An encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 2, one IFDMA symbol is composed of Q-number of symbols D0, D1 (Q=2 in the figure).

A time-domain compression and repetition unit 13 compresses the time domains of the two symbols D0, D1 of the IFDMA symbol, then repeats each symbol L times (L=4 in the figure); and a rearrangement unit 14 rearranges the repetitive-symbol sequence so that it has the same arrangement as the symbol sequence D0, D1 (see (c) of FIG. 2). By taking Tc to be the period of the symbols obtained by this repetition, the symbol sequence will be repeated at the period Ts=Tc×Q.

A symbol-phase-rotation unit 15 performs phase rotation specific to the symbols for the rearranged repetitive symbol sequence. For example, as shown in (d) of FIG. 2, the symbol-phase-rotation unit 15 keeps the symbols D0 of the rearranged symbol sequence as they are (does not perform phase rotation), and performs symbol-specific phase rotation of the symbols D1 so that the phase increases in increments of π such as 0, π, 2π (=0), 3π (=−π), . . . for each symbol. A UE-phase-rotation unit 16 performs phase rotation specific to the mobile station (UE: User Equipment) for each symbol output from the symbol-phase-rotation unit 15, and as shown in (e) of FIG. 2, a CP-attachment unit 17 attaches a CP (Cyclic Prefix) to the start of the repetitive-symbol sequence for each IFDMA symbol, and a transmission unit 18 performs up-conversion of the frequency of the symbol sequence to which a CP is attached from a baseband frequency to a radio frequency, then amplifies the signal and transmits it from an antenna.

A numerical controlled oscillator (NCO) 19 calculates the amount of phase rotation θ for each unit time Tc, and a complex multiplier (not shown in the figure) of the phase-rotation unit 16 performs phase rotation specific to the mobile station for each symbol of the repetitive-symbol sequence that is input and performs frequency-shift processing. The phase $θ_k(t)$ that is output from the NCO 19 when Q number (=2) of symbols have been repeated L times (=4) is expressed by Equation (1). In the NCO 19, a frequency-shift-setting unit 19a is the portion that sets the amount Δω of change of phase rotation (angular velocity) per unit time Tc, and it uses the parameters k, L, Q that are set by the parameter-setting unit 19b to calculate and output the angular velocity Δω according to Equation (2). A rotation-phase-amount-setting unit 19c comprises a delay unit DLY that applies a delay time T (=Tc) that is set by a delay-time-setting unit 19d, and an adder ADD, and it performs the calculation of Equation (2a) at each unit time T while increasing the amount of phase rotation θ in increments of Δω, and outputs the result. A conversion unit 19e calculates the I, Q components (x, y) in the complex plane of the amount of phase rotation θ and inputs the results to the phase-rotation unit 16. Taking the symbols output from the symbol-phase-rotation unit 15 to be S (=X+jY), the phase-rotation unit 16 performs the calculation (X+jY)×(x+jy)

and outputs the result.

A symbol-phase-rotation-amount-generation unit 20 generates the amount of phase rotation for the symbols D0 of the symbol sequence, and a symbol-phase-rotation-amount-generation unit 21 generates the amount of phase rotation for the symbols D1 of the symbol sequence. The symbols D0, D1 are alternately input to the symbol-phase-rotation unit 15, so in synchronization with that, the amounts of phase rotation generated by the symbol-phase-rotation-amount-generation units 20, 21 are alternately input by way of a switch 22 to the symbol-phase-rotation unit 15. In the example shown in FIG. 2, the amount of phase rotation performed for symbols D0 is 0, the amount of phase rotation performed for symbols D1 is π, so the symbol-phase-rotation-amount-generation unit 20 generates a phase-rotation amount of 0 (0, 0, 0, . . . ) after each repetitive symbol period Ts and inputs it to the phase-rotation unit 15, and the symbol-phase-rotation-amount-generation unit 21 generates a phase-rotation amount that increases in increments of π (0, π, 2π (=0), 3π (=−π) after each repetitive symbol period Ts and inputs it to the phase-rotation unit 15.

Figure 3:
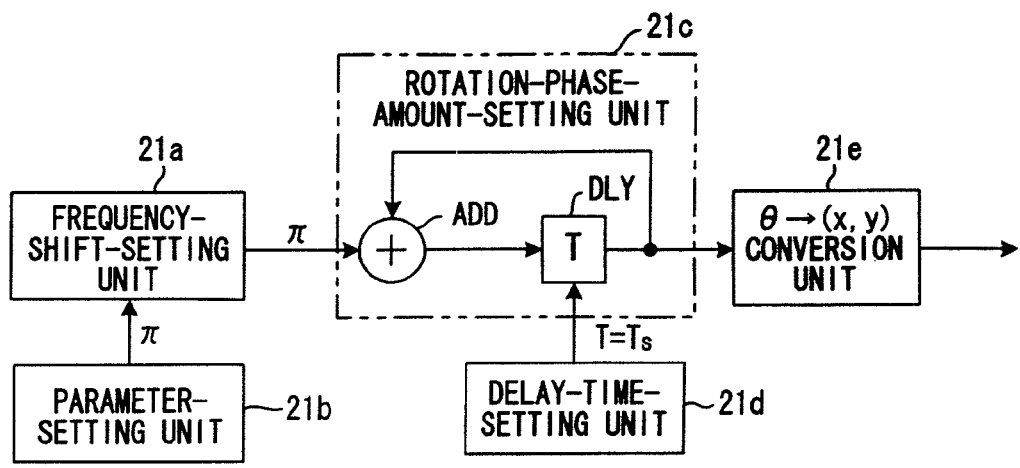
FIG. 3 is a drawing showing the construction of a symbol-phase-rotation-amount-generation unit.

The symbol-phase-rotation-amount-generation units 20, 21 comprise the same construction as the numerical controlled oscillator (NCO) 19. FIG. 3 is a drawing showing the construction of the symbol-phase-rotation-amount-generation unit 21, in which a frequency-shift-setting unit 21a is the section that sets the amount of change in phase rotation π per unit time Ts, and outputs the parameter π that was set by a parameter-setting unit 21b. A rotation-phase-amount-setting unit 21c comprises a delay unit DLY that applies a delay time T (=Ts) that is set by a delay-time-setting unit 21d, and an adder ADD, and it performs the calculation of Equation (2a) at each unit time Ts while increasing the amount of phase rotation θ in increments of π, and outputs the result. A conversion unit 21e calculates the I, Q components (x, y) in the complex plane of the amount of phase rotation θ and inputs the results to the symbol-phase-rotation unit 15.

Figure 4:
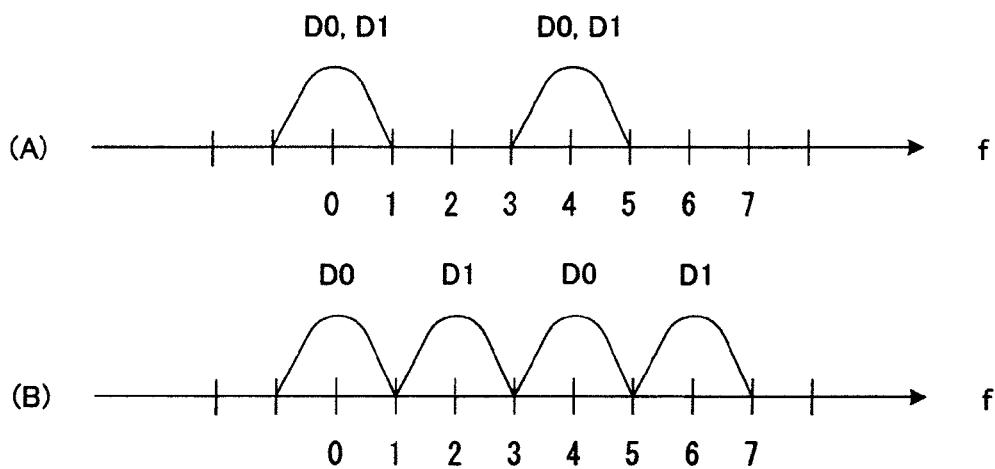
FIG. 4 is a drawing explaining the frequency spectrum for k=0 (first mobile station) in the first embodiment of the invention.

In the symbol-phase-rotation unit 15, when phase rotation in not performed for a symbol, the frequency spectrum for the first mobile station (k=0) becomes as shown in (A) of FIG. 4, and in the symbol-phase-rotation unit 15, when phase rotation that increases in increments of π is performed for just the symbols D1, the frequency spectrum becomes as shown in (B) of FIG. 4. As can be seen from (B) of FIG. 4, in this first embodiment, (1) symbols D0 are transmitted using orthogonal frequencies f0 and f4, (2) symbols D1 are transmitted using orthogonal frequencies f2 and f6, and (3) symbols D0 and D1 are transmitted using frequencies that are orthogonal to each other. This is the same as transmitting all of the symbols D0, D1 of the IFDMA symbol by a plurality of sub carriers in the OFDM method, and degradation of transmission due to multi-path interference caused by delay waves whose delay time is shorter than the CP period does not occur.

(b) Frequency-Division Multiplexing Receiving Apparatus of the First Embodiment

Figure 5:
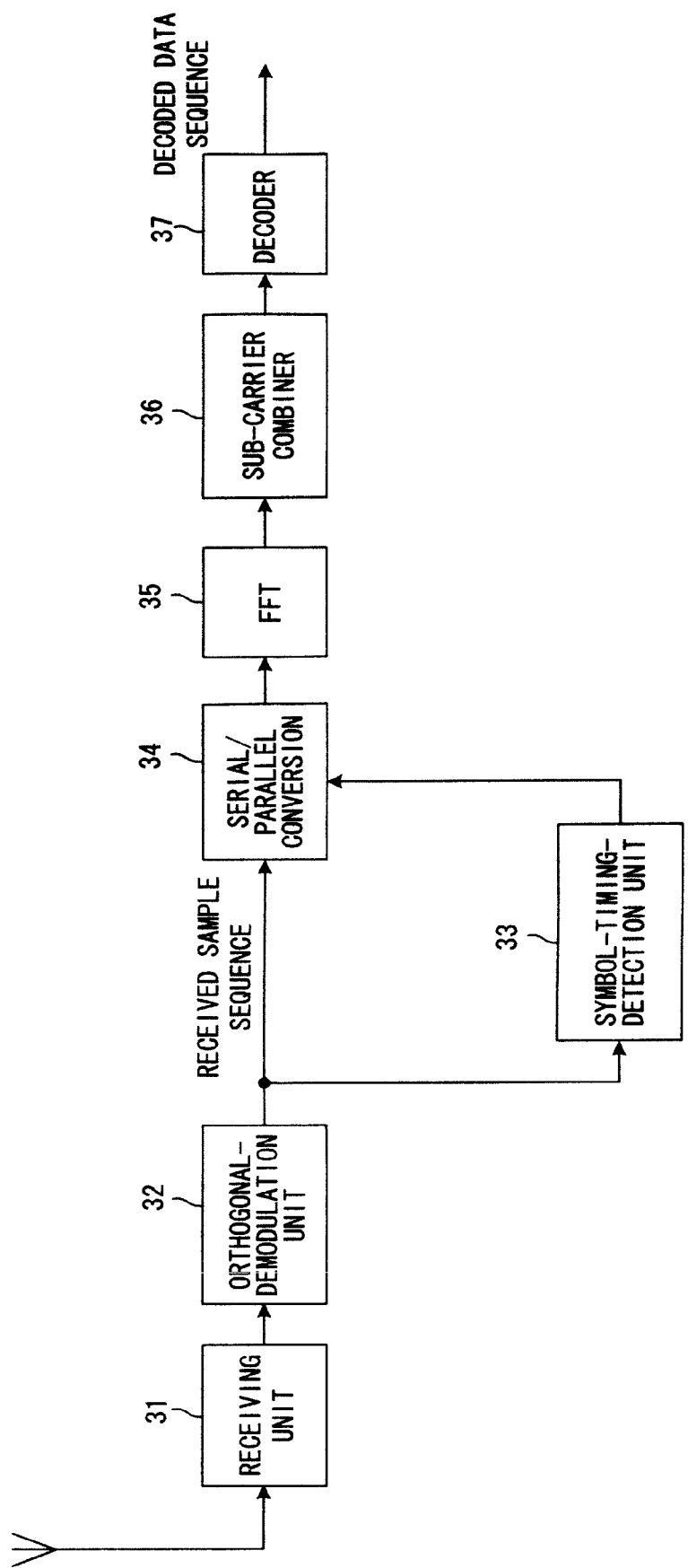
FIG. 5 is a block diagram of a frequency-division multiplexing receiving apparatus of a first embodiment of the invention.

FIG. 5 is a block diagram of a frequency-division multiplexing receiving apparatus of the first embodiment.

A wireless-receiving unit 31 receives a radio signal, and performs down conversion of the frequency to a baseband frequency, then an orthogonal-demodulation unit 32 performs demodulation, such as QPSK demodulation, of the baseband signal, and an AD converter (not shown in the figure) converts the demodulation result (received-symbol sequence) to digital, and inputs the result to a symbol-timing-detection unit 33 and serial-to-parallel converter 34. The symbol-timing-detection unit 33 detects the IFDMA symbol timing from the received-symbol sequence, and the serial-to-parallel converter 34 deletes the CP from the received-symbol sequence based on that IFDMA symbol timing (frame-symbol timing), and converts the received-symbol sequence from serial to parallel. A FFT unit 35 performs FFT conversion of all of the symbol data that was converted to parallel, and generates a plurality of sub-carrier components (frequency spectrum). In the example shown in FIG. 4(B), symbol data D0, D1, D0, D1 corresponding to frequencies f0, f2, f4 and f6 are output as the sub-carrier components.

A sub-carrier-combiner 36 combines the components for frequencies f0 and f4 and outputs the result as symbol data D0, and combines the components for frequencies f2 and f6 and outputs the result as symbol data D1. A decoder 37 performs an error-correction-decoding process on the input symbols D0, D1, and inputs the result to a data-processing unit (not shown in the figure).

(c) Gain of Received Signals in a 1-Path Model

The received signals at each sampling point of a 1-path model (timing of each symbol of the repetitive-symbol sequence) are given by the equations below. Here n is the noise at each sampling point.

$R_0 = D0 + n_0$ $R_1 = D1 + n_1$ $R_2 = D0 + n_2$ $R_3 = -D1 + n_3$ $R_4 = D0 + n_4$ $R_5 = D1 + n_5$ $R_6 = D0 + n_6$ $R_7 = -D1 + n_7$ (3a)

The Fourier coefficient $S_k$ of the complex frequency $f_k$ is expressed as $$S_k = \frac{1}{N}\sum_{m=0}^{N-1} R_m \exp(-2\pi kmj/N) \quad (4)$$

where the signal component for the frequency $f_0$ is expressed by the following equation.

$$S_0 = \sum_{m=0}^{7} R_m \quad (5)$$

$$= \sum_{m=0}^{7}\begin{pmatrix} D0 + n_0 + D1 + n_1 + D0 + n_2 - \\ D1 + n_3 + D0 + n_4 + \\ D1 + n_5 + D0 + n_6 - D1 + n_7 \end{pmatrix}$$

$$= 4 \cdot D0 + \sum_{m=0}^{7} n_m$$

Similarly, the signal component for the frequency $f_4$ is expressed by the following equation.

$$S_4 = \sum_{m=0}^{7}(R_m \times (-1)^m) \quad (6)$$

$$= \sum_{m=0}^{7}\begin{pmatrix} D0 + n_0 - (D1 + n_1) + D0 + n_2 - (-D1 + n_3) + \\ D0 + n_4 - (D1 + n_5) + D0 + n_6 - (-D1 + n_7) \end{pmatrix}$$

$$= 4 \cdot D0 + n_0 - n_1 + n_2 - n_3 + n_4 - n_5 + n_6 - n_7$$

As a result, the signal component that is the in-phase combination of frequency $f_0$ and frequency $f_4$ is given by:

$$S_{0+4} = S_0 + S_4 \quad (7)$$

$$= 8 \cdot D0 + 2(n_0 + n_2 + n_4 + n_6)$$

where SNR (Signal to Noise Ratio) is given by:

$$SNR = \frac{(8 \cdot D0)^2}{2^2(n_0^2 + n_2^2 + n_4^2 + n_6^2)} = \frac{64 D0^2}{16 n^2} = 4\frac{D0^2}{n^2} \quad (8)$$

From this it can be seen that a spread gain is obtained. This is because one symbol is transmitted using a plurality of overlapping frequencies.

(d) Gain of Received Signals in a 2-Path Model and Decreasing MPI

Figure 6:
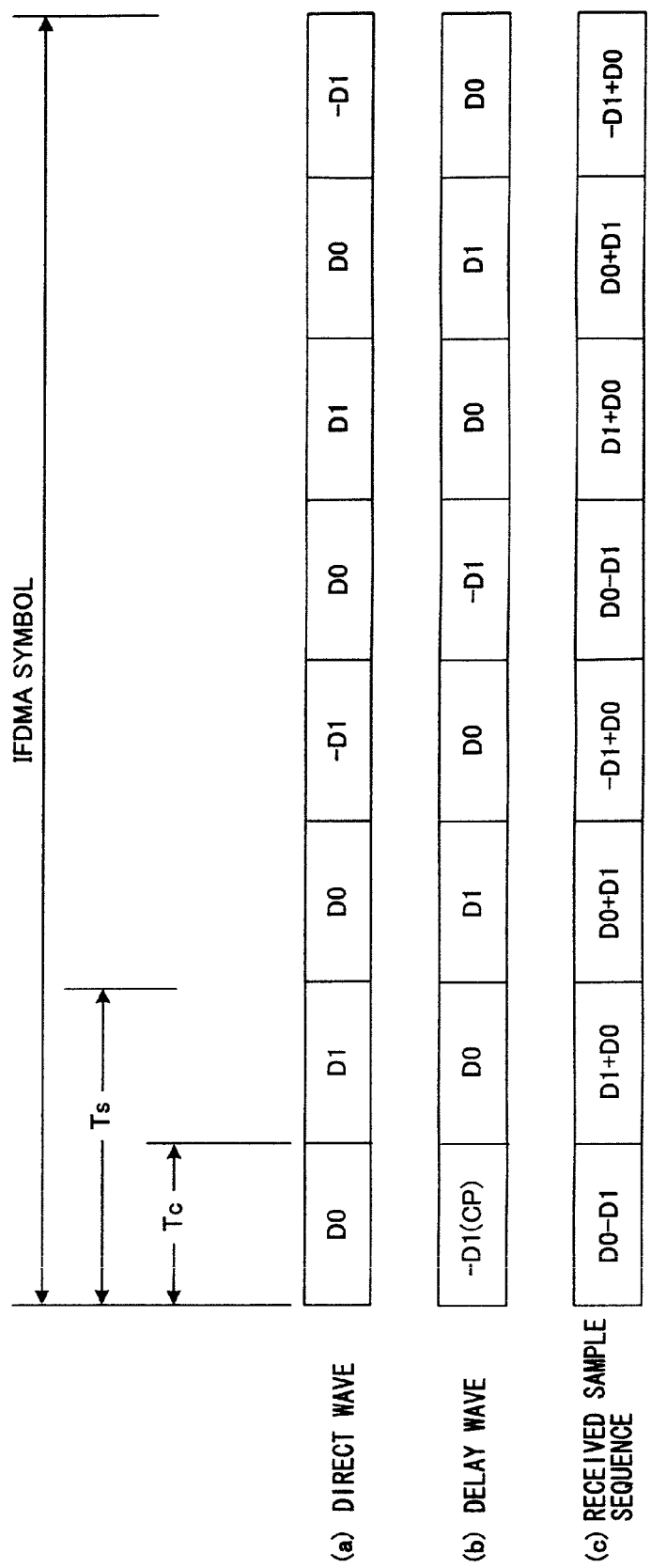
FIG. 6 is an example of a received signal when there is multi-path interference.

FIG. 6 shows an example in a case where there is multi-path interference, where (a) is a direct wave, (b) is a delay wave, and (c) is a received sample sequence composed of a combination of the direct wave and delay wave. The figure shows an example in which the delay wave is delayed one sample from the direct wave. The received signals of a 2-path model are expressed by the following equations.

$R_0 = D0 - D1 + n_0$ $R_1 = D1 + D0 + n_1$ $R_2 = D0 + D1 + n_2$ $R_3 = -D1 + D0 + n_3$ $R_4 = D0 - D1 + n_4$ $$R_5 = D1 + D0 + n_5$$

$$R_6 = D0 + D1 + n_6$$

$$R_7 = -D1 + D0 + n_7 \qquad (9)$$

The signal component for frequency $f_0$ is expressed by the following equation.

$$\begin{aligned} S_0 &= \sum_{m=0}^{7} Rm \\ &= D0 - D1 + n_0 + D1 + D0 + n_1 + D0 + D1 + n_2 - \\ &\quad D1 + D0 + n_3 + D0 - D1 + n_4 + \\ &\quad D1 + D0 + n_5 + D0 + D1 + n_6 - D1 + D0 + n_7 \\ &= 8 \cdot D0 + \sum_{m=0}^{7} n_m \end{aligned} \qquad (10)$$

The signal component for frequency f4 is expressed by the equation below.

$$\begin{aligned} S_4 &= \sum_{m=0}^{7} (Rm \times (-1)^m) \\ &= D0 - D1 + n_0 - (D1 + D0 + n_1) + D0 + D1 + n_2 - \\ &\quad (-D1 + D0 + n_3) + D0 - D1 + n_4 - (D1 + D0 + n_5) + \\ &\quad D0 + D1 + n_6 - (-D1 + D0 + n_7) \\ &= n_0 - n_1 + n_2 - n_3 + n_4 - n_5 + n_6 - n_7 \end{aligned} \qquad (11)$$

As a result, the signal component that is the in-phase combination of frequency f0 and frequency f4 becomes $$\begin{aligned} S_{0+4} &= S_0 + S_4 \\ &= 8 \cdot D0 + 2(n_0 + n_2 + n_4 + n_6) \end{aligned} \qquad (12)$$

and SNR is given by the equation below.

$$\begin{aligned} SNR &= \frac{(8 \cdot D0)^2}{2^2 (n_0^2 + n_2^2 + n_4^2 + n_6^2)} \\ &= \frac{64 D0^2}{16 n^2} \\ &= 4 \frac{D0}{n^2} \end{aligned} \qquad (13)$$

From the above, a spread gain is obtained even in a multi-path environment, MPI is decreased, and a frequency diversity effect due to OFDM also occurs.

(e) Second Mobile Station

Figure 7:
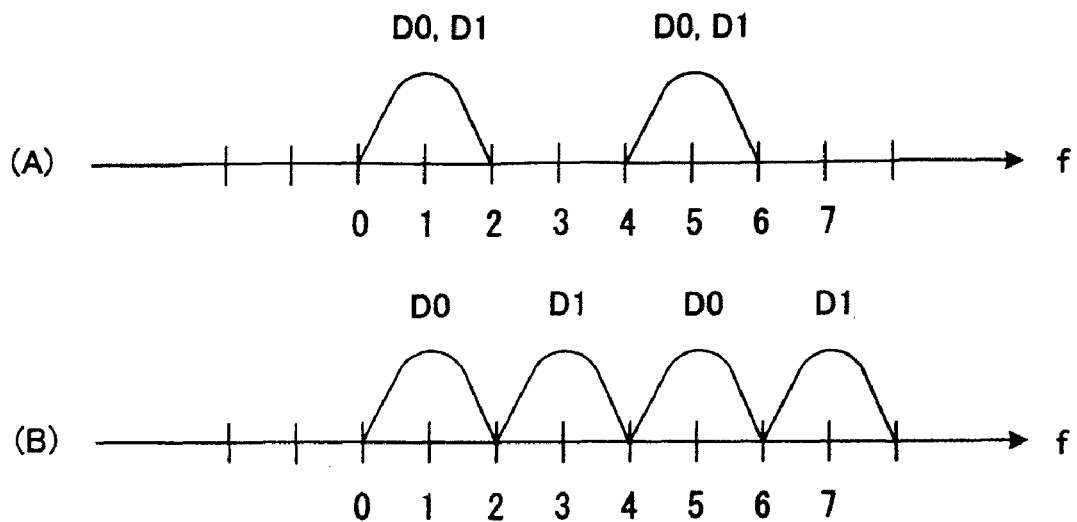
FIG. 7 is a drawing explaining the frequency spectrum for k=1 (second mobile station) in the first embodiment of the invention.

FIG. 4 shows the frequency spectrum for a first mobile station (k=0), and the frequency spectrum for a second mobile station (k=1) is shown in (B) of FIG. 7. In other words, when the symbol-phase-rotation unit 15 does not perform phase rotation for symbols, the frequency spectrum of the second mobile station (k=1) becomes as shown by (A) of FIG. 7, however, when the symbol-phase-rotation unit 15 performs phase rotation that increases in increments of $\pi$ for each of the symbols D1, the frequency spectrum becomes as shown in (B) of FIG. 7. From (B) of FIG. 7 it can be see that: (1) symbols D0 are transmitted using orthogonal frequencies f1 and f5, (2) symbols D1 are transmitted using orthogonal frequencies f3 and f7, and (3) symbols D0 and D1 are transmitted using frequencies that are orthogonal to each other.

Figure 8:
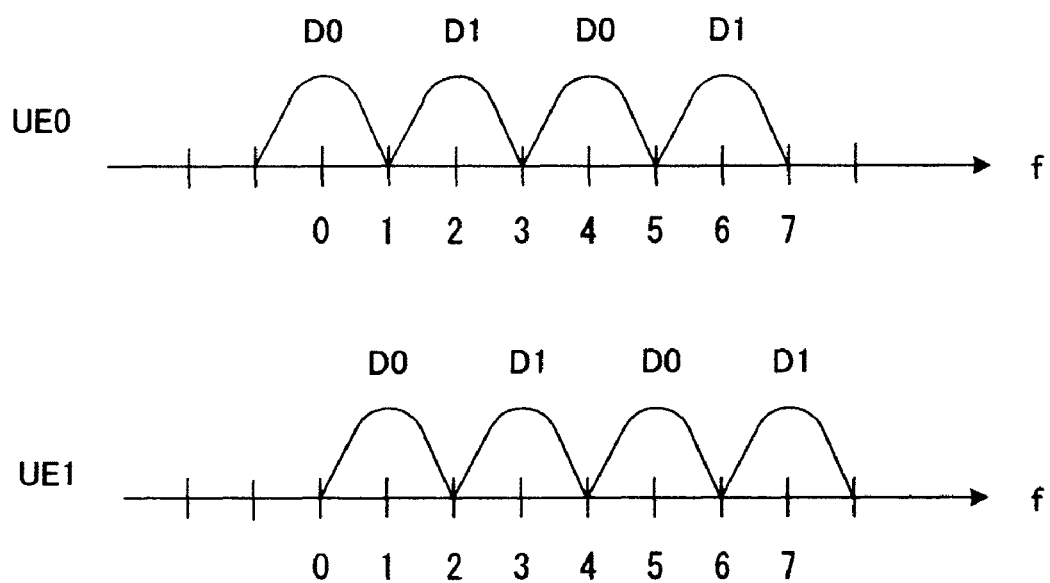
FIG. 8 is a drawing explaining the frequency spectrum for a first user UE0 and a second user UE1.

From the above, as shown in FIG. 8, the data from a first user UE0 are transmitted by frequencies f0, f2, f4 and f6, and the data from a second user UE1 are transmitted by the frequencies f1, f3, f5 and f7; the data are transmitted using frequencies that are orthogonal to each other so that interference does not occur.

With the first embodiment, pseudo-like OFDM can be realized, so there is no need for a multi-path canceller, and it is possible to reduce multi-path interference.

(B) Second Embodiment

Figure 9:
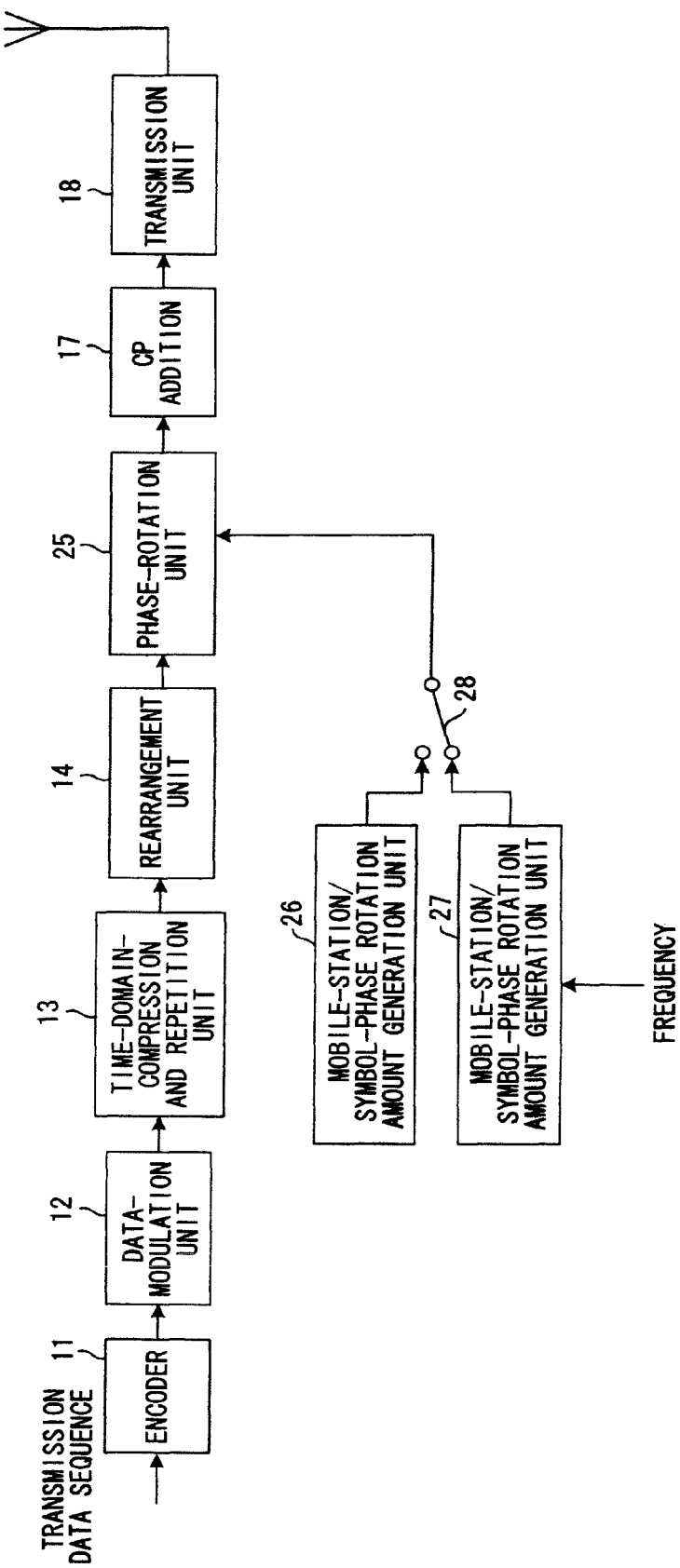
FIG. 9 is a block diagram of a frequency-division multiplexing transmission apparatus of a second embodiment of the invention.

FIG. 9 is a block diagram of a frequency-division multiplexing transmission apparatus of a second embodiment, and the same reference numbers are assigned to parts that are identical with those of the first embodiment shown in FIG. 1. The difference between FIGS. 1 and 9 is that the phase-rotation units 15 and 16 in FIG. 1 are combined to be a single phase-rotation unit 25 in FIG. 25.

An encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 2, one IFDMA symbol is composed of Q-number of symbols D0, D1 (Q=2 in the figure).

A time-domain compression and repetition unit 13 compresses the time domains of the two symbols D0, D1 of the IFDMA symbol, then repeats each symbol L times (L=4 in the figure); and a rearrangement unit 14 rearranges the repetitive-symbol sequence so that it has the same arrangement as the symbol sequence D0, D1 (see (c) of FIG. 2). By taking Tc to be the period of the symbols obtained by this repetition, the symbol sequence will be repeated at the period Ts=Tc×Q.

A phase-rotation unit 25 performs phase rotation specific to the symbols D0, D1 and the mobile station for each respective symbol of the rearranged repetitive-symbol sequence, and as shown in (e) of FIG. 2, a CP-attachment unit 17 attaches a CP (Cyclic Prefix) to the start of the repetitive-symbol sequence for each IFDMA symbol, and a transmission unit 18 performs up-conversion of the frequency of the symbol sequence to which a CP is attached from a baseband frequency to a radio frequency, then amplifies the signal and transmits it from an antenna.

A mobile-station/symbol-phase rotation amount generation unit 26 generates the amount of phase rotation corresponding to the mobile station and symbols D0, and a mobile-station/symbol-phase rotation amount generation unit 27 generates the amount of phase rotation corresponding to the mobile station and symbols D1. The symbols D0, D1 are alternately input to the phase-rotation unit 15, and in synchronization with that, a switch 28 alternately inputs the amount of phase rotation generated by the mobile-station/symbol-phase rotation amount generation units 26, 27 to the phase-rotation unit 25.

The amount of phase rotation corresponding to the mobile station is $2\pi k/L \times Q$ (L×Q=8 in the example shown in FIG. 2, so this is $\pi k/4$), the amount of phase rotation corresponding to symbols D0 is 0, and the amount of phase rotation corresponding to symbols D1 is π, so the mobile-station/symbol-phase rotation amount generation unit 26 generates the phase-rotation amount for the symbols D0 after each period Ts of symbol repetition as $$0 \to 0+2\times\pi k/4 \to 0+4\times\pi k/4 \to 0+6\times\pi k/4 \to \ldots$$

Also, the mobile-station/symbol-phase rotation amount generation unit 27 generates the phase-rotation amount for the symbols D1 after each period Ts of symbol repetition as $$0+\pi k/4 \to \pi+3\times\pi k/4 \to 2\pi+5\times\pi k/4 \to 3\pi+7\times\pi k/4 \to \ldots$$

The switch 28 alternately inputs the amount of phase rotation for these symbols D0, D1 to the phase-rotation unit 25 after each symbol period Tc.

With this second embodiment, it is possible to obtain the same effect as in the first embodiment, and the phase-rotation unit can be integrated into one. The frequency-division multiplexing receiving apparatus has the same construction as the frequency-division multiplexing receiving apparatus of the first embodiment shown in FIG. 5.

Figure 10:
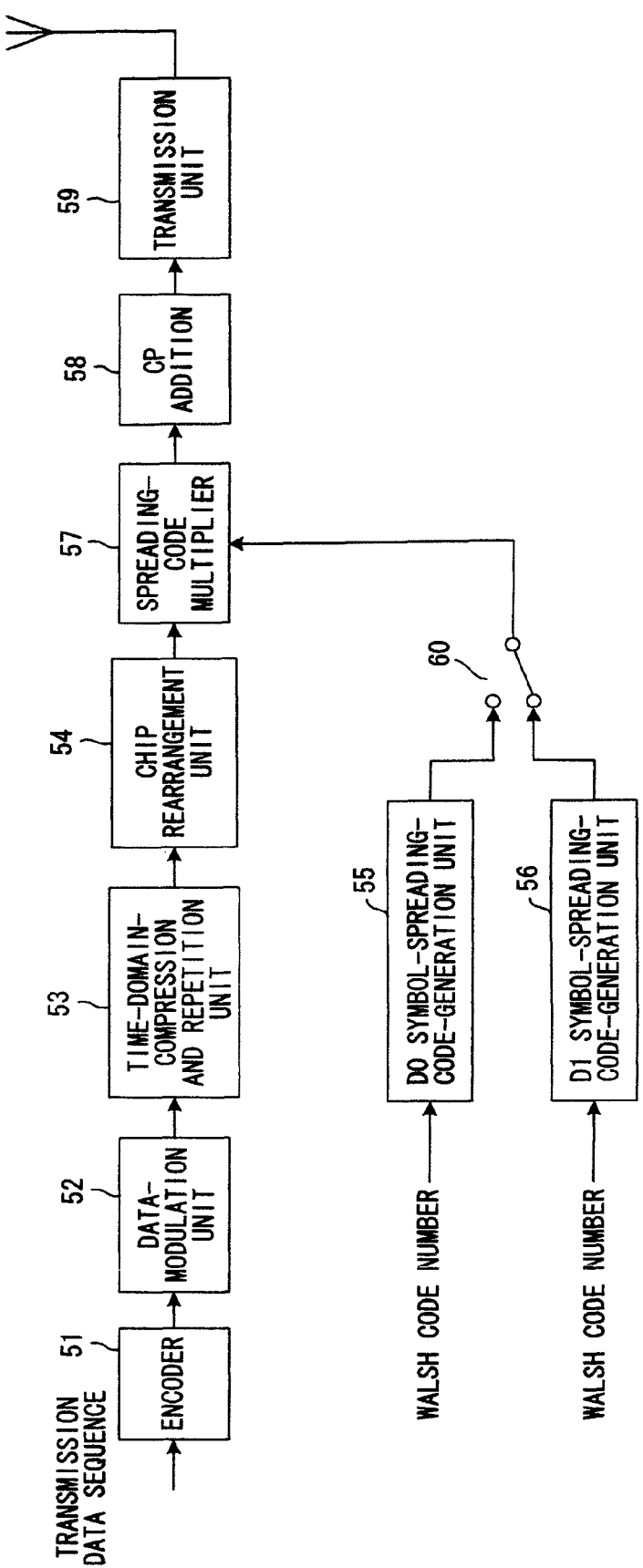
FIG. 10 is a block diagram of a wave-number-division multiplexing transmission apparatus for transmitting data in a wave-number spectrum of a third embodiment of the invention.
Figure 11:
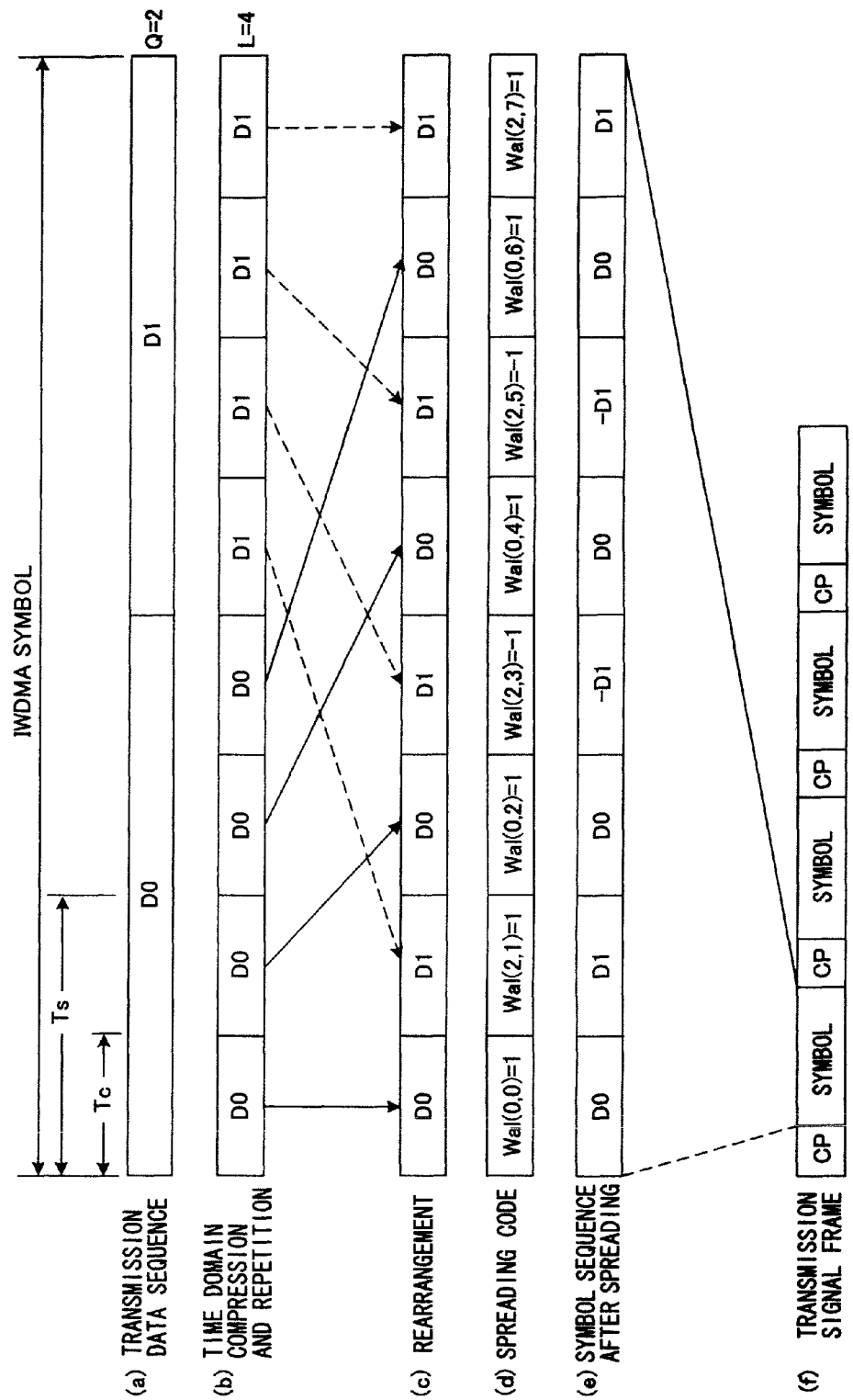
FIG. 11 is a timing chart for explaining the operation of the wave-number-division multiplexing transmission apparatus shown in FIG. 10.

(C) Third Embodiment (a) Wave-Number-Division Multiplexing Transmission Apparatus FIG. 10 is a block diagram of a wave-number-division multiplexing transmission apparatus of a third embodiment of the invention that transmits data by a wave-number spectrum, and FIG. 11 is a timing chart for explaining the operation of the wave-number-division multiplexing transmission apparatus shown in FIG. 10. The wave-number-division multiplexing transmission apparatus of this third embodiment can be used as a mobile station.

An encoder 51 performs channel encoding by applying error-correction encoding such as turbo encoding, or convolutional encoding to the input binary information sequence, and a data-modulation unit 52 converts the channel-encoded data sequence to I, Q complex components (symbols) in QPSK, for example. As shown in (a) of FIG. 11, one IWDMA symbol is composed of Q-number of symbols D0, D1 (Q=2 in the figure).

A time-domain compression and repetition unit 53 compresses the time domains of the two symbols D0, D1 of the IWDMA symbol, then repeats each symbol L times (L=4 in the figure); and a rearrangement unit 54 rearranges the repetitive-symbol sequence so that it has the same arrangement as the symbol sequence D0, D1 (see (c) of FIG. 11). By taking Tc to be the period of the symbols obtained by this repetition, the symbol sequence will be repeated at the period Ts=Tc×Q.

As shown in (d) of FIG. 11, spreading-code-generation units 55, 56 use Walsh code to generate orthogonal spreading code specific to the symbols and the mobile station. For example, expressing the nth element of the nth wave-number code of the Walsh code as Wal (m, n), the spreading-code-generation unit 55 generates at each symbol period Tc a spreading-code sequence Wal (0,0), Wal (0,1), Wal (0,2), Wal (0,3), Wal (0,4), Wal (0,5), Wal (0,6), Wal (0,7) each of which is multiplied with the symbol D0. And the spreading-code-generation unit 56 generates the spreading-code sequence Wal (2,0), Wal (2,1), Wal (2,2), Wal (2,3), Wal (2,4), Wal (2,5), Wal (2,6), Wal (2,7) each of which is multiplied with the symbol D1. A switch alternately selects the generated code from the spreading-code-generation units 55, 56 at each symbol period Tc, and inputs the code to a spreading-code multiplier 57, and the spreading-code multiplier 57 multiplies the rearranged repetitive symbols D0, D1 by the spreading code and performs the spreading process. The spread symbol sequence becomes as shown in (e) of FIG. 11.

As shown in (f) of FIG. 11, a CP-attachment unit 58 attaches a CP (Cyclic Prefix) to the start of the symbol sequence which is multiplied by spreading code, and a transmission unit 59 performs up-conversion of the frequency of the symbol sequence to which the CP has been attached from a baseband frequency to a radio frequency, and then amplifies the signal and transmits it from an antenna.

(b) Spreading Code

The spreading-code-generation units 55, 56 use Walsh code to generate orthogonal spreading code specific to the symbols and mobile station as shown below. In the case of using 8-dimensional Walsh code as shown below, the 8-dimensional Walsh code is expressed as follows.

$$W_8 = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} = \begin{bmatrix} w0 \\ w1 \\ w2 \\ w3 \\ w4 \\ w5 \\ w6 \\ w7 \end{bmatrix} \quad (14)$$

In this 8-dimensional Walsh code, the code of each of the wave numbers wi, wj is orthogonal with each other, and have the relationship here of wi×wj=0.

Figure 12:
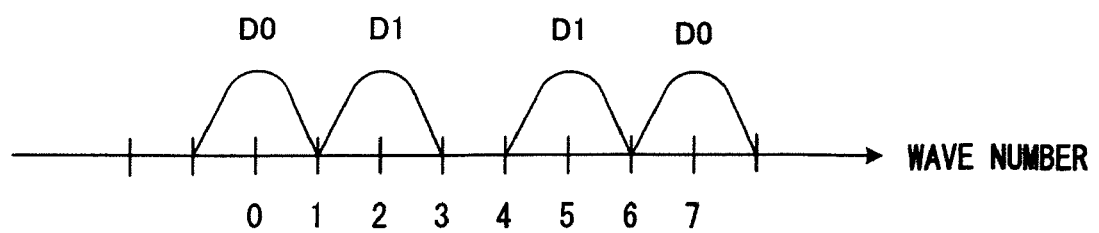
FIG. 12 is a drawing explaining the wave-number spectrum for a first mobile station of the third embodiment of the invention.

When the symbols D0 are spread using the code for wave number w0 (spreading code=w0), the symbols D0 are multiplied every other one by the code for wave number w0. At the timing of this multiplication, the code for wave number w0 and wave number w7 is the same, so as shown in FIG. 12, the symbols D0 are output in wave number w0 and w7. Also, when the symbols D1 are spread using the code for wave number w2, the symbols D1 are multiplied every other one by the code for wave number w2. At the timing of this multiplication, the code for wave number w2 and wave number −1×w5 is the same, so as shown in FIG. 12, the symbols D1 are output in wave numbers w2 and w5 (the phase is reverse).

The wave spectrum shown in FIG. 12 can be obtained by performing Walsh conversion of the transmission signal.

The Walsh conversion equation G(m) is defined as given below.

$$G(m) = \frac{1}{N} \sum_{m=0}^{N-1} g(n) wal(m, n) \quad (15)$$

In the example shown in FIG. 11

$$g = [D0\,D1\,D0\,-D1\,D0\,-D1\,D0\,D1] \quad (16)$$

so the Walsh conversion equation is expressed by the following equations.

$$G(0) = \frac{1}{8}\sum_{n=0}^{7} g(n) \cdot wal(0, n)$$
$$= \frac{1}{8}\begin{pmatrix} D0 \times 1 + D1 \times 1 + D0 \times 1 - D1 \times 1 + \\ D0 \times 1 - D1 \times 1 + D0 \times 1 + D1 \times 1 \end{pmatrix}$$
$$= \frac{D0}{2}$$

$$G(1) = \frac{1}{8}\sum_{n=0}^{7} g(n) \cdot wal(1, n)$$
$$= \frac{1}{8}\begin{pmatrix} D0 \times 1 + D1 \times 1 + D0 \times 1 - D1 \times 1 + D0 \times \\ (-1) - D1 \times (-1) + D0 \times (-1) + D1 \times (-1) \end{pmatrix}$$
$$= 0$$

$$G(2) = \frac{1}{8}\sum_{n=0}^{7} g(n) \cdot wal(2, n)$$
$$= \frac{1}{8}\begin{pmatrix} D0 \times 1 + D1 \times 1 + D0 \times (-1) - D1 \times (-1) + \\ D0 \times (-1) - D1 \times (-1) + D0 \times 1 + D1 \times 1 \end{pmatrix}$$
$$= \frac{D1}{2}$$

$$G(3) = \frac{1}{8}\sum_{n=0}^{7} g(n) \cdot wal(3, n)$$
$$= \frac{1}{8}\begin{pmatrix} D0 \times 1 + D1 \times 1 + D0 \times (-1) - D1 \times (-1) + \\ D0 \times 1 - D1 \times 1 + D0 \times (-1) + D1 \times (-1) \end{pmatrix}$$
$$= 0$$

$$G(4) = \frac{1}{8}\sum_{n=0}^{7} g(n) \cdot wal(4, n)$$
$$= \frac{1}{8}\begin{pmatrix} D0 \times 1 + D1 \times (-1) + D0 \times (-1) - D1 \times 1 + \\ D0 \times 1 - D1 \times (-1) + D0 \times (-1) + D1 \times 1 \end{pmatrix}$$
$$= 0$$

$$G(5) = \frac{1}{8}\sum_{n=0}^{7} g(n) \cdot wal(5, n)$$
$$= \frac{1}{8}\begin{pmatrix} D0 \times 1 + D1 \times (-1) + D0 \times (-1) - D1 \times 1 + \\ D0 \times (-1) - D1 \times 1 + D0 + 1 + D1 \times (-1) \end{pmatrix}$$
$$= \frac{-D1}{2}$$

$$G(6) = \frac{1}{8}\sum_{n=0}^{7} g(n) \cdot wal(6, n)$$
$$= \frac{1}{8}\begin{pmatrix} D0 \times 1 + D1 \times (-1) + D0 \times 1 - D1 \times (-1) + \\ D0 \times (-1) - D1 \times 1 + D0 \times (-1) + D1 \times 1 \end{pmatrix}$$
$$= 0$$

$$G(7) = \frac{1}{8}\sum_{n=0}^{7} g(n) \cdot wal(7, n)$$
$$= \frac{1}{8}\begin{pmatrix} D0 \times 1 + D1 \times (-1) + D0 \times 1 - D1 \times (-1) + \\ D0 \times 1 - D1 \times (-1) + D0 \times 1 + D1 \times (-1) \end{pmatrix}$$
$$= \frac{D0}{2}$$

(17)

In this way, the symbols D0 are output in frequencies w0 and w7, and the symbols D1 are output in frequencies w2 and w5. In other words, symbols D0 are multiplexed with frequencies w0 and w7, and symbols D1 are multiplexed with frequencies w2 and w5.

(c) Wave-Number-Division Multiplexing Receiving Apparatus

Figure 13:
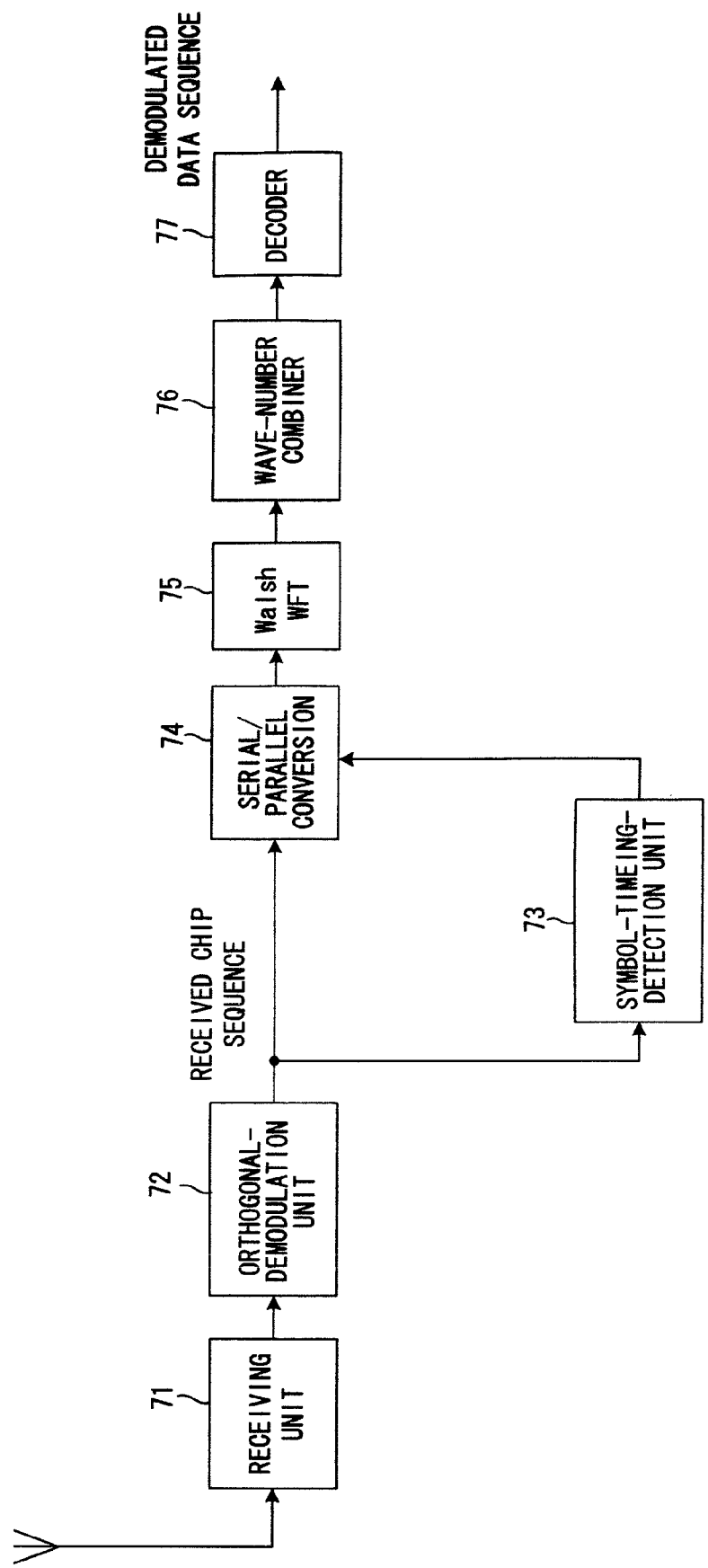
FIG. 13 is a block diagram of a wave-number-division multiplexing receiving apparatus of the third embodiment of the invention.

FIG. 13 is a block diagram of a wave-number-division multiplexing receiving apparatus of this third embodiment of the invention.

A wireless-receiving unit 71 receives a radio signal and performs down conversion of the frequency to a baseband signal, the an orthogonal-demodulation unit 72 performs QPSK demodulation of the baseband signal, and an AD converter (not shown in the figure) converts the demodulated result (received symbol sequence) to digital and inputs the result to a symbol-timing-detection unit 73 and serial/parallel converter 74. The symbol-timing-detection unit 73 detects the IWDMA symbol timing (frame symbol timing) from the received symbol sequence, and the serial/parallel converter 74 deletes the CP from the received symbol sequence based on the IWDMA symbol timing, and performs serial-to-parallel conversion of the received symbol sequence. A Walsh WFT unit 75 performs WFT conversion of the symbol data that has been converted to parallel data, and generates a plurality of wave-number components (wave-number spectrum). In the case of the example shown in FIG. 12, symbol data D0, D1, D0, D1 are output in correspondence to the wave numbers w0, w2, w5, w7 as wave number components.

A wave-number combiner 76 combines the components of wave numbers w0, w7 and outputs the result as symbol data D0, and combines the sub-carrier components of wave numbers w2, w5 and outputs the result as symbol data D1. A decoder 77 performs error-correction decoding of the symbols D0, D1 that are input, and inputs the result to a data processing unit (not shown in the figure).

(d) Gain of Received Signals in a 1-Path Model

The received signals at each sampling point of a 1-path model (timing of each symbol of the repetitive-symbol sequence) are given by the equations below. Here n is the noise at each sampling point.

$R_0 = D0 + n_0$ $R_1 = D1 + n_1$ $R_2 = D0 + n_2$ $R_3 = -D1 + n_3$ $R_4 = D0 + n_4$ $R_5 = -D1 + n_5$ $R_6 = D0 + n_6$ $R_7 = D1 + n_7$ (18)

The signal component for wave number w0 is given by the following equation.

$$S_0 = \sum_{m=0}^{7} Rm \cdot wal(0, m)$$ (19)

$$= \sum_{m=0}^{7} \binom{D0 + n_0 + D1 + n_1 + D0 + n_2 - D1 + n_3 +}{D0 + n_4 - D1 + n_5 + D0 + n_6 + D1 + n_7}$$

$$= 4 \cdot D0 + \sum_{m=0}^{7} n_m$$

The signal component for wave number w7 is given by the following equation.

$$S_7 = \sum_{m=0}^{7} Rm \cdot wal(7, m) \quad (20)$$

$$= \sum_{i=0}^{7} \binom{D0 + n_0 - (D1 + n_1) + D0 + n_2 - (-D1 + n_3) +}{D0 + n_4 - (-D1 + n_5) + D0 + n_6 - (D1 + n_7)}$$

$$= 4 \cdot D0 + n_0 - n_1 + n_2 - n_3 + n_4 - n_5 + n_6 - n_7$$

As a result, the combined signal component of wave numbers w0 and w7 becomes $$S_0 + S_7 = 8D0 + 2(n_0 + n_2 + n_4 + n_6) \quad (21)$$

and SNR is given by the following equation.

$$SNR = \frac{(8 \cdot D0)^2}{2^2(n_0^2 + n_2^2 + n_4^2 + n_6^2)} \quad (22)$$

$$= \frac{64D0^2}{16n^2}$$

$$= 4\frac{D0^2}{n^2}$$

From this, it can be seen that a spread gain is obtained. This is because symbol is transmitted using a plurality of wave numbers.

(e) Gain of Received Signals in a 2-Path Model and Decreasing MPI

Figure 14:
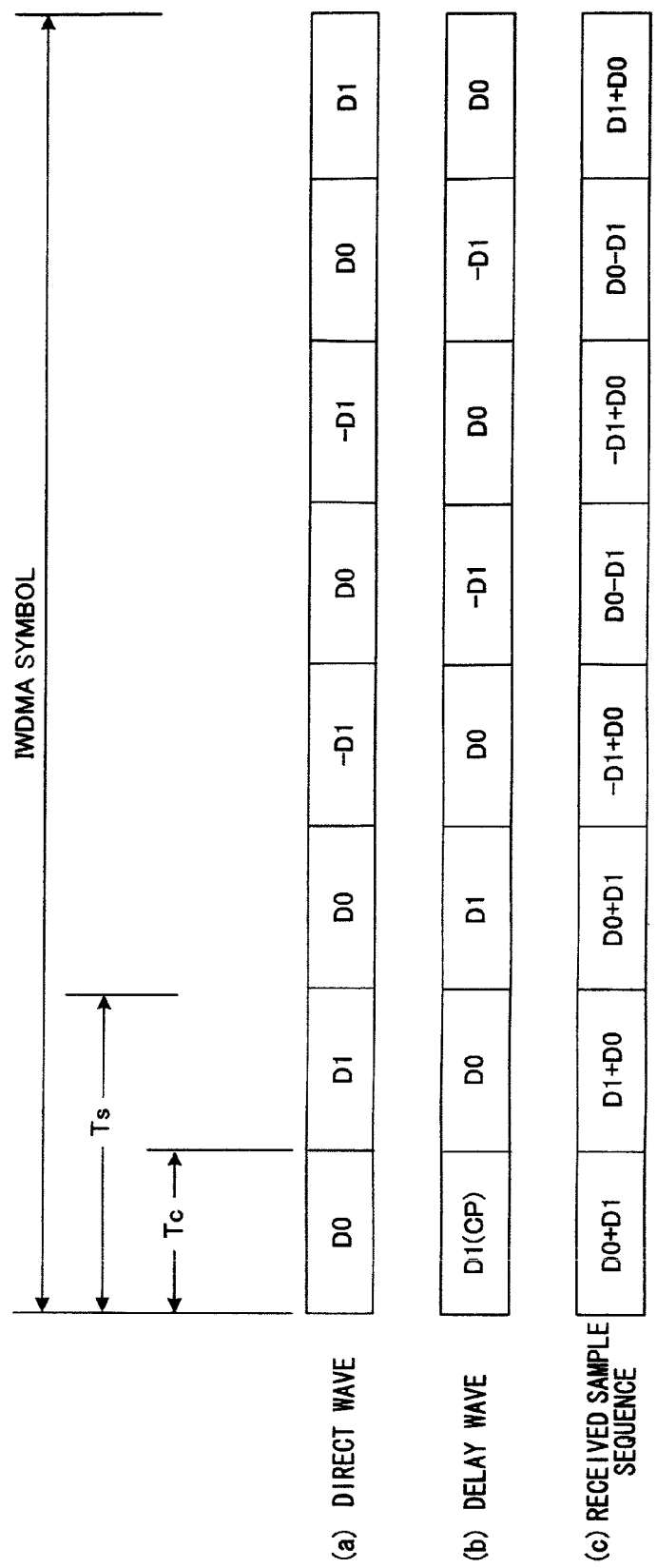
FIG. 14 is an example of a received signal when there is multi-path interference.

FIG. 14 shows an example in a case where there is multipath interference in FIG. 14, (a) is a direct wave, (b) is a delay wave, and (c) is a received sample sequence composed of a combination of the direct wave and delay wave. The figure shows an example in which the delay wave is delayed one sample from the direct wave. The received signals of a 2-path model are expressed by the following equations.

$$R_0 = D0 + D1 + n_0$$

$$R_1 = D1 + D0 + n_1$$

$$R_2 = D0 + D1 + n_2$$

$$R_3 = -D1 + D0 + n_3$$

$$R_4 = D0 - D1 + n_4$$

$$R_5 = -D1 + D0 + n_5$$

$$R_6 = D0 - D1 + n_6$$

$$R_7 = D1 + D0 + n_7 \quad (23)$$

The signal component for wave number w0 is expressed by the equation below $$S_0 = \sum_{m=0}^{7} Rm \cdot wal(0, m) \quad (24)$$

$$= D0 + D1 + n_0 + D1 + D0 + n_1 + D0 + D1 + n_2 -$$

$$D1 + D0 + n_3 + D0 - D1 + n_4 - D1 + D0 + n_5 +$$

$$D0 - D1 + n_6 + D1 + D0 + n_7$$

$$= 8 \cdot D0 + \sum_{m=0}^{7} n_m$$

and the signal component for the wave number w7 is expressed by the following equation.

$$S_0 = \sum_{m=0}^{7} Rm \cdot wal(7, m) \quad (25)$$

$$= D0 + D1 + n_0 - (D1 + D0 + n_1) +$$

$$D0 + D1 + n_2 - (-D1 + D0 + n_3) +$$

$$D0 - D1 + n_4 - (-D1 + D0 + n_5) +$$

$$D0 - D1 + n_6 - (D1 + D0 + n_7)$$

$$= n_0 - n_1 + n_2 - n_3 + n_4 - n_5 + n_6 - n_7$$

As a result, the combined signal for wave numbers w0 and w7 becomes $$S_0 + S_7 = 8D0 + 2(n_0 + n_2 + n_4 + n_6) \quad (26)$$

and SNR is given by the following equation.

$$SNR = \frac{(8 \cdot D0)^2}{2^2(n_0^2 + n_2^2 + n_4^2 + n_6^2)} \quad (27)$$

$$= \frac{64D0^2}{16n^2}$$

$$= 4\frac{D0^2}{n^2}$$

From the above, spread gain is obtained even in a multi-path environment, and MPI is decreased.

(f) Second Mobile Station

Figure 15:
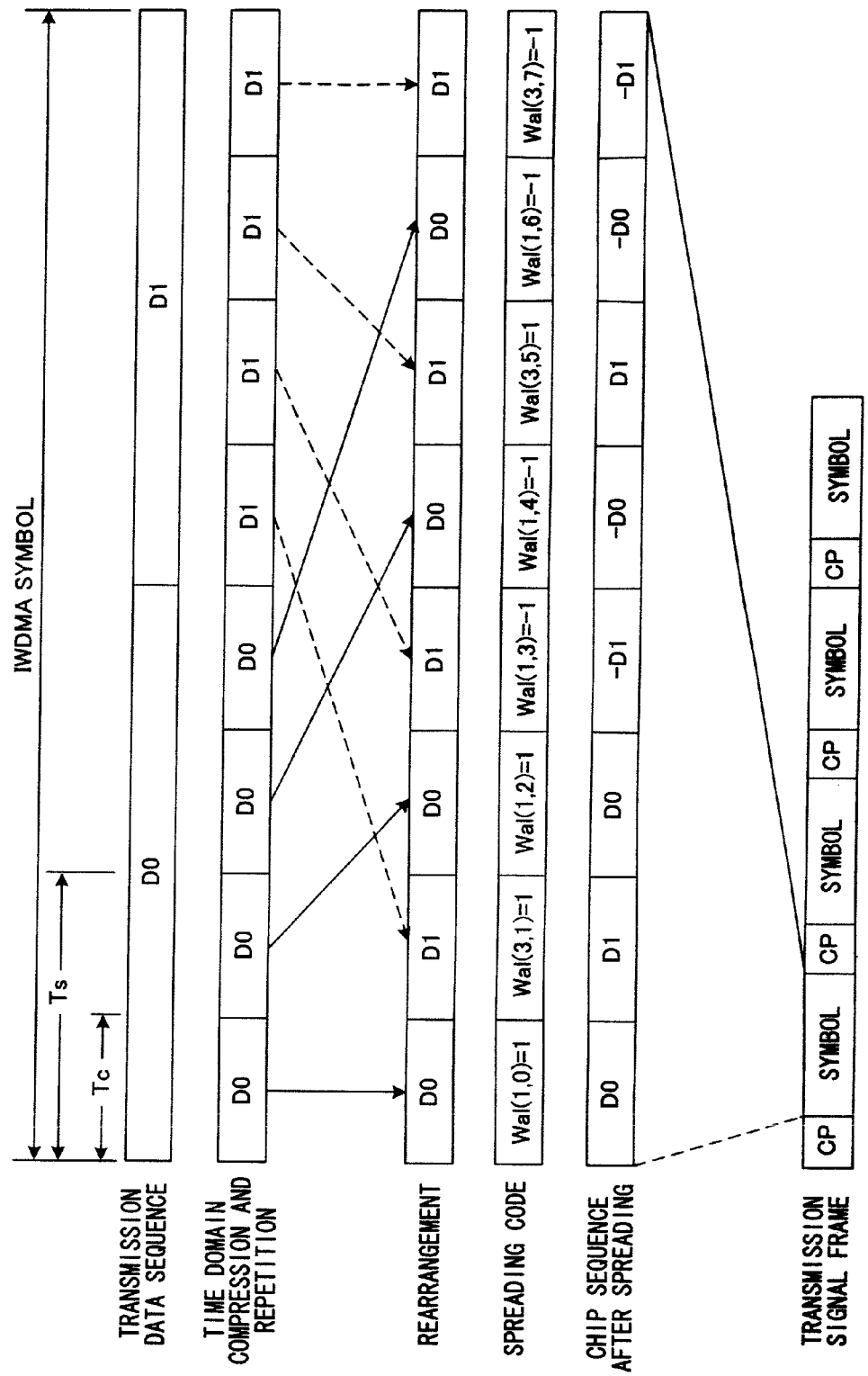
FIG. 15 is a timing chart for a second mobile station.
Figure 16:
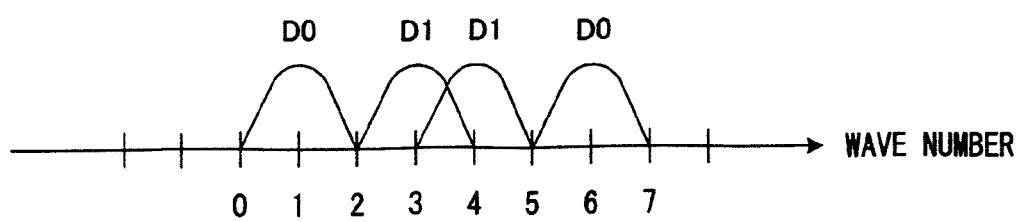
FIG. 16 is a drawing explaining the wave-number spectrum for a second mobile station of the third embodiment of the invention.

FIG. 15 is a timing chart for explaining the operation of a second mobile station, and is an example of using w1, w6, w3, w4 as spreading code for the second mobile station. When spreading symbols D0 is spread using the code of wave number w1 (spreading code=w1), symbols D0 are multiplied by the code of wave number w1 every other one. At the timing of this multiplication, wave number w1 and wave number w6 are the same code, so as shown in FIG. 16, the symbols D0 are output at wave numbers w1 and w6. Also, when spreading symbols D1 is spread using the code of wave number w3, symbols D1 are multiplied by the code of wave number w3 every other one. At the timing of this multiplication, wave number w3 and wave number −1×w4 are the same code, so as shown in FIG. 16, symbols D1 are output at wave numbers w2 and w4.

The wave number spectrum shown in FIG. 16 can be obtained by performing Walsh conversion of the transmission signal. Similar to the case of the first mobile station, the signal of the second mobile station and result of Walsh conversion are given by the equations below.

$$g = [D0 \ D1 \ D0 \ -D1 \ -D0 \ D1 \ -D0 \ -D1] \quad (28)$$

$$G(0) = 0 \quad (29)$$
$$G(1) = \frac{D0}{2}$$
$$G(2) = 0$$
$$G(3) = \frac{D1}{2}$$
$$G(4) = \frac{-D1}{2}$$
$$G(5) = 0$$
$$G(6) = \frac{D0}{2}$$
$$G(7) = 0$$

Figure 17:
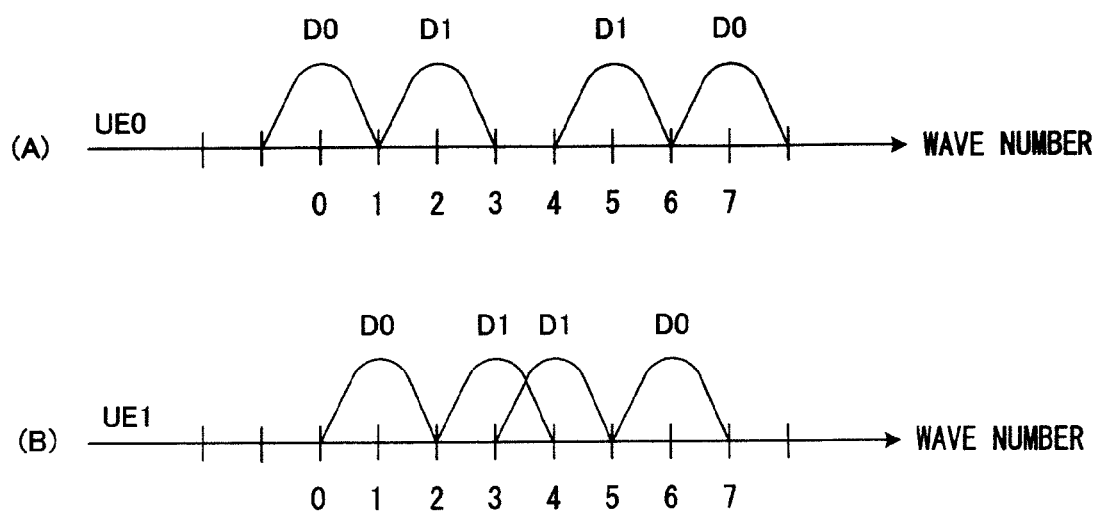
FIG. 17 is a drawing explaining the wave-number spectrum for the first and second mobile station of the third embodiment of the invention.

FIG. 17 shows the combined wave number spectrum for the first mobile station (UE0) and second mobile station (UE1). As shown in FIG. 17, the first mobile station and second mobile station are multiplexed using orthogonal wave numbers. Therefore it is possible to reduce MAI.

As can be seen from above explanation, with this third embodiment, it is possible to reduce multi-path interference without the need of a multi-path interference canceller.

(D) Fourth Embodiment

Figure 18:
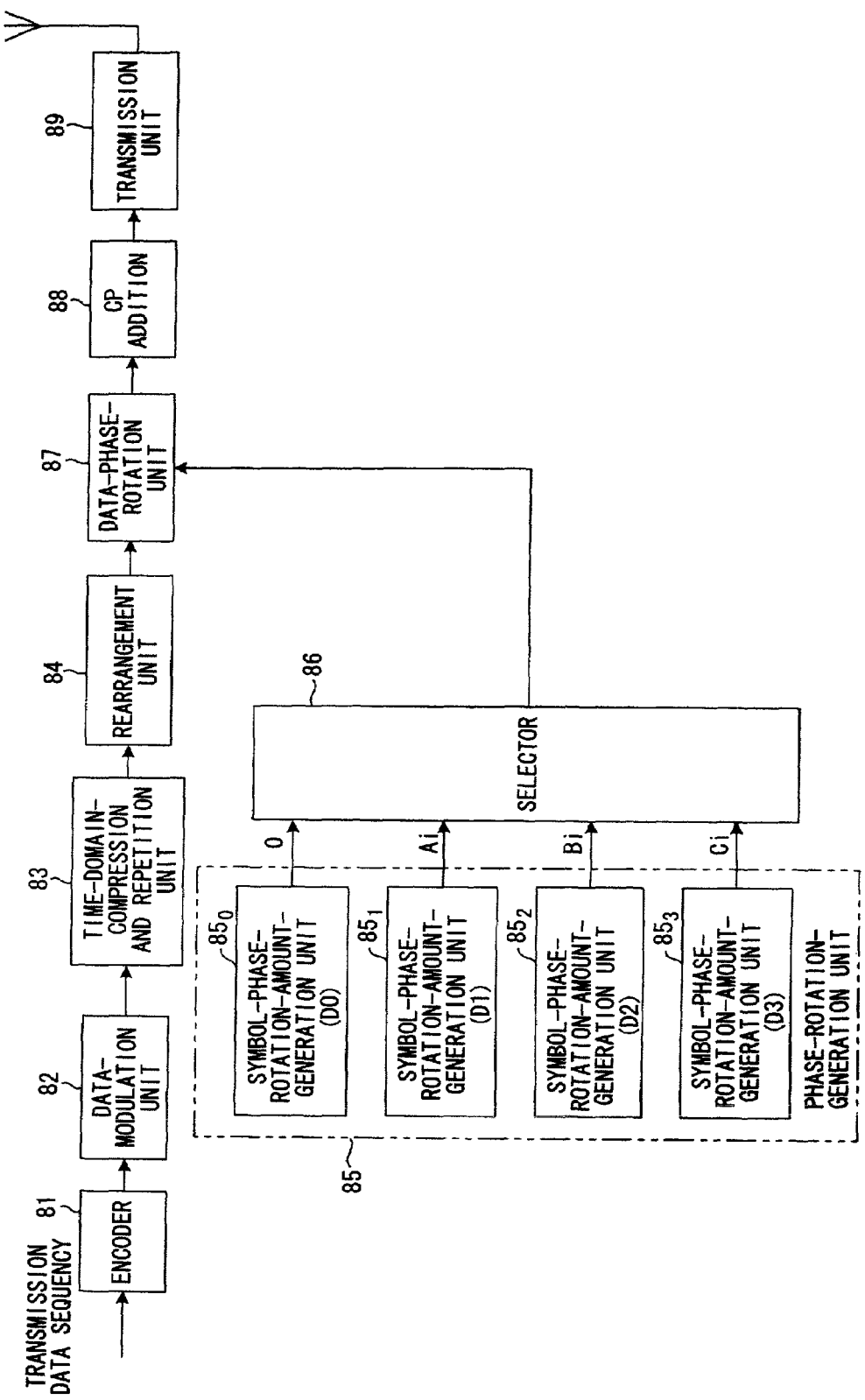
FIG. 18 is a block diagram of a frequency-division multiplexing transmission apparatus of a fourth embodiment of the invention.
Figure 19:
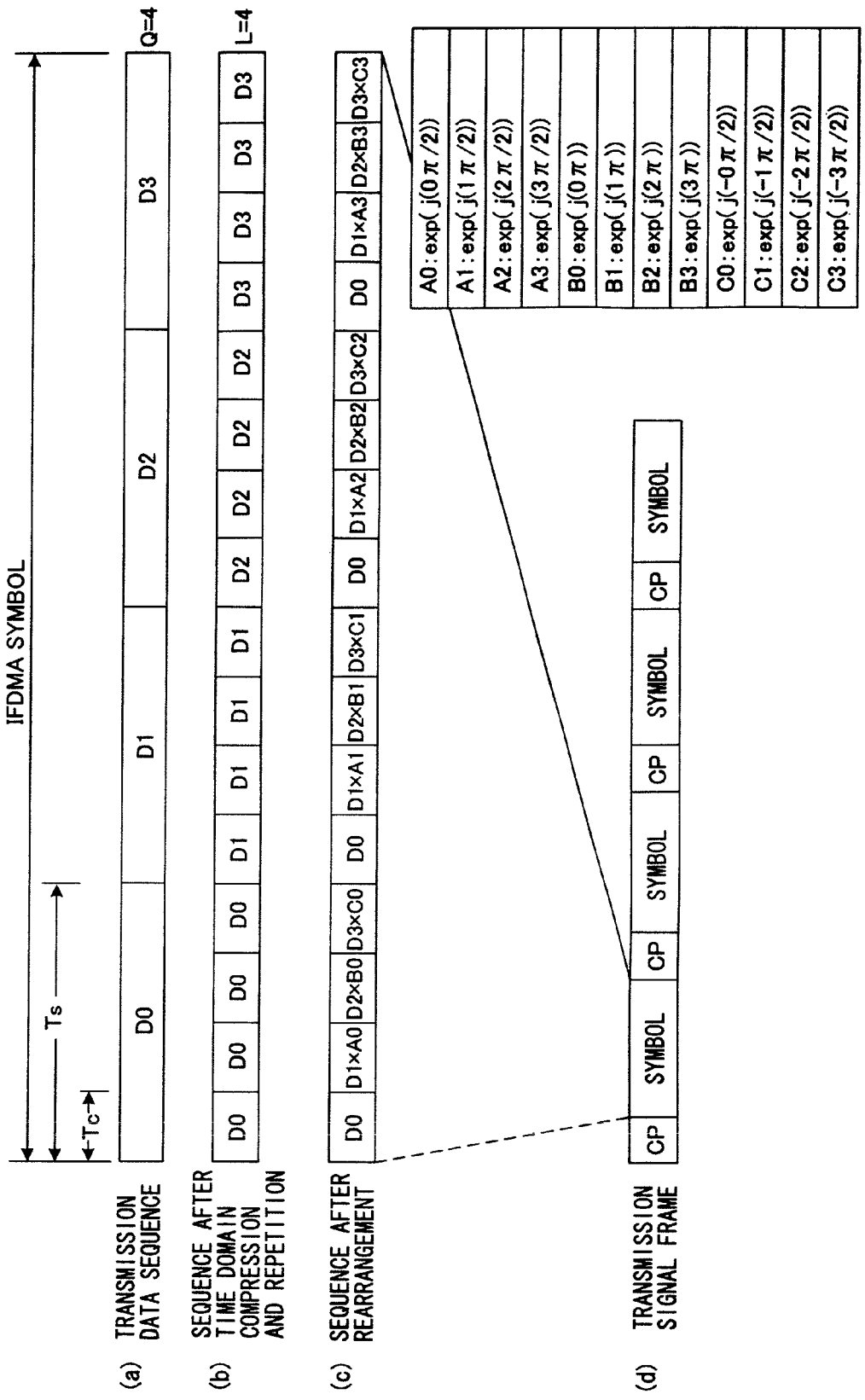
FIG. 19 is a timing chart explaining the operation of the frequency-division multiplexing transmission apparatus shown in FIG. 18.

FIG. 18 is a block diagram of a frequency-division multiplexing transmission apparatus of a fourth embodiment of the invention, and FIG. 19 is a timing chart for explaining the operation of the frequency-division multiplexing transmission apparatus shown in FIG. 18. The frequency-division multiplexing transmission apparatus of this fourth embodiment can be used as a base station.

An encoder 81 performs channel encoding by applying error-correction encoding such as turbo encoding, or convolutional encoding to the input binary information sequence, and a data-modulation unit 82 converts the channel-encoded data sequence to I, Q complex components (symbols) in QPSK, for example. As shown in (a) of FIG. 19, one IFDMA symbol is composed of Q-number of symbols D0, D1, D2, D3 (Q=4 in the figure).

A time-domain compression and repetition unit 83 compresses the time domains of each of the four symbols D0, D1, D2, D3 of the IFDMA symbol as shown in (b) of FIG. 19, and repeats each symbol L times (L=4 in the figure) to generate a repetitive-symbol sequence, then a rearrangement unit 84 rearranges the repetitive-symbol sequence so that it has the same arrangement as the symbol sequence D0, D1, D2, D3. Taking the period of an obtained repeated symbol to be Tc, the period Ts of the repeated symbols becomes Ts=Tc×Q.

Symbol-phase-rotation-amount-generation units $85_0$, $85_1$, $85_2$, $85_3$ of a phase-rotation-amount-generation unit 85 generate phase-rotation amounts specific to the symbols for each of the symbols D0, D1, D2, D3, and at the timing of the symbols D0, D1, D2, D3, a selector 86 inputs the phase-rotation amounts that are output from the corresponding symbol-phase-rotation-amount-generation units $85_0$, $85_1$, $85_2$, $85_3$ to a data-phase-rotation unit 87.

The symbol-phase-rotation-amount-generation unit $85_0$ generates 0 as the phase-rotation amount for symbols D0, the symbol-phase-rotation-amount-generation unit $85_1$ generates Ai (i=0, 1, 2, . . . ) that increases in increments of π/2 as shown in FIG. 19 as the phase-rotation amount for symbols D1, the symbol-phase-rotation-amount-generation unit $85_2$ generates Bi (i=0, 1, 2, . . . ) that increases in increments of 2π/2 as shown in FIG. 19 as the phase-rotation amount for symbols D2, and the symbol-phase-rotation-amount-generation unit $85_3$ generates Ci (i=0, 1, 2, . . . ) that increases in increments of 3π/2 as shown in FIG. 19 as the phase-rotation amount for symbols D3.

The data-phase-rotation unit 87 multiplies the rearranged repeated symbols D0, D1, D2, D3 by the phase-rotation amounts specific for each symbol that is output from the selector 86. The symbol sequence after phase rotation becomes as shown in (c) of FIG. 19.

Figure 20:
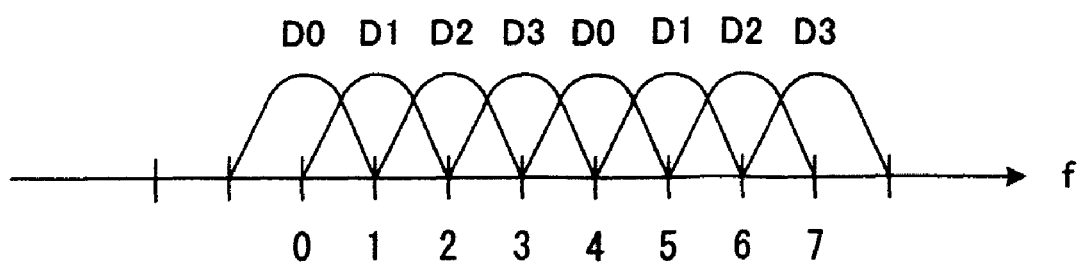
FIG. 20 is a drawing showing the frequency spectrum of the fourth embodiment.
Figure 21:
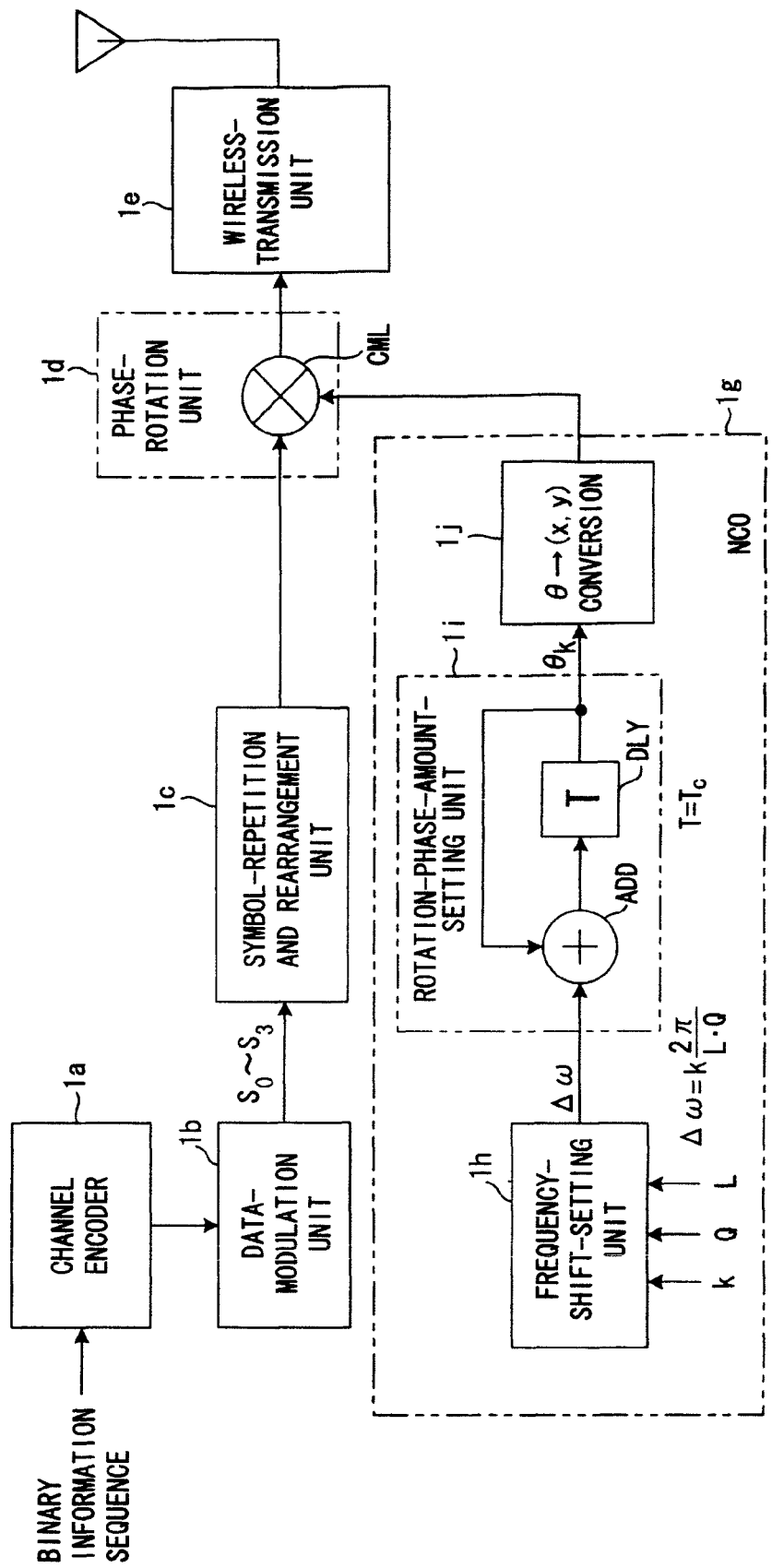
FIG. 21 is a drawing showing the construction of a mobile station that employs the IFDMA modulation method.
Figure 22:
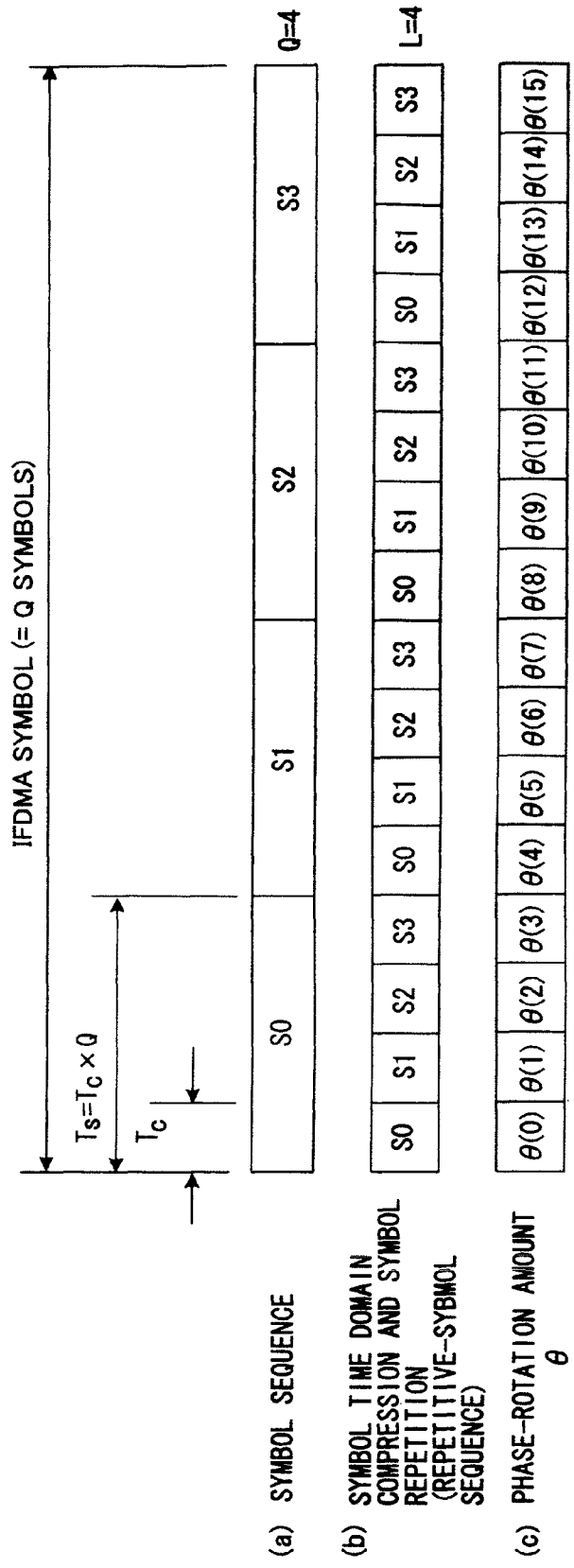
FIG. 22 is a drawing explaining an IFDMA symbol.

A CP-attachment unit 88 attaches a CP (Cyclic Prefix) to the start of the symbol sequence for which phase rotation was performed for each IFDMA symbol, and a transmission unit 89 performs up-conversion of the frequency of the symbol sequence to which a CP is attached from a baseband frequency to a radio frequency, then amplifies the signal and transmits it from an antenna. FIG. 20 shows the frequency spectrum of this fourth embodiment.

It is not shown in the figure, however, the frequency-division multiplexing receiving apparatus of the fourth embodiment of the invention comprises: a wireless-receiving unit; an orthogonal-demodulation unit; a CP-removal unit; a phase-rotation unit that performs phase rotation that is reverse that of the transmission apparatus; a sub-carrier-combiner that combines the components of frequencies f0, f4 and outputs the result as symbol data D0, combines the components of frequencies f1, f5 and outputs the result as symbol data D1, combines the components of frequencies f2, f6 and outputs the result as symbol data D2, and combines the components of frequencies f3, f7 and outputs the result as symbol data D3; and a decoder to which the symbols D0, D1, D2, D3 are input, and that performs error-correction decoding and inputs the result to a data-processing unit.

With this fourth embodiment, symbols D0 are output in frequencies f0, f4, symbols D1 are output in frequencies f1, f5, symbols D2 are output in frequencies f2, f6, and symbols D3 are output in frequencies f3, f7. As a result, the signal becomes a pseudo-like OFDM signal, and together with improving resistance to multi-path interference, a frequency-diversity effect occurs. Also, the signal is created by time-division multiplexing, so PAPR does not become large.

As many apparently widely different embodiments of the present invention can be made without departing from the spirit and scope thereof, it is to be understood that the invention is not limited to the specific embodiments thereof except as defined in the appended claims.

What is claimed is:

1. A wave-number-division multiplexing transmission apparatus that transmits data in a wave-number spectrum specific to both symbol and mobile station, and comprising:

an encoder for encoding transmission data;

a data-modulation unit for modulating output data from said encoder;

a time-domain compression and repetition unit for compressing the time domains of each symbol of the transmission-symbol sequence that is output from said modulation unit, and repeating the symbols a specified number of times;

a symbol-rearrangement unit for rearranging each of the symbols of the obtained repetitive-symbol sequence so that they have the same arrangement as said transmission-symbol sequence;

a spreading-code-generation unit for generating a specified wave number code that makes up a Walsh code as a spreading code for each symbol of said repetitive-symbol sequence;

a spreading unit for multiplying each symbol of said repetitive-symbol sequence with said spreading code to spread the symbols; and a transmission unit for transmitting the output from said spreading unit.

2. The wave-number-division multiplexing transmission apparatus of claim 1 wherein;

said spreading-code-generation unit generates a different wave-number code that makes up a Walsh code for each mobile station as said spreading code.

3. A wave-number-division multiplexing receiving apparatus of claim 1, comprising:

a receiving unit for receiving signals transmitted from said transmission apparatus;

an orthogonal-demodulation unit for demodulating each of the symbols of said repetitive-symbol sequence from the received signal;

a timing-detection unit for detecting frame-symbol timing of the received symbol sequence;

a Walsh WFT processing unit for selecting the received symbol sequence at the timing detected by the timing-detection unit, and performing Walsh WFT conversion of the received symbol sequence to convert it to a wave number spectrum;

a combiner for combining the wave-number spectra specific to the symbol of the transmission-symbol sequence and the mobile station for each mobile station and symbol; and a decoder for decoding the data from the combined signals of each symbol.

4. A wave-number-division multiplexing transmission method for transmitting data in a wave-number spectrum specific to both symbol and mobile station, and comprising:

a first step of encoding transmission data, and modulating the encoded data;

a second step of compressing the time domains of each symbol of the modulated transmission-symbol sequence, and repeating the symbols a specified number of times;

a third step of rearranging each of the symbols of the obtained repetitive-symbol sequence so that they have the same arrangement as said transmission-symbol sequence;

a fourth step of generating a specified wave number code that makes up a Walsh code as a spreading code for each symbol of said repetitive-symbol sequence, and multiplying each symbol of said repetitive-symbol sequence with said spreading code to spread the symbols; and a fifth step of transmitting said spread output.

5. The wave-number-division multiplexing transmission method of claim 4, wherein;

a different wave-number code that makes up a Walsh code for each mobile station as said spreading code is generated.

6. A wave-number-division multiplexing receiving method of claim 4, comprising:

a sixth step of receiving signals transmitted from said transmission apparatus, and demodulating each of the symbols of said repetitive-symbol sequence from the received signal;

a seventh step of detecting frame-symbol timing of the received symbol sequence, selecting the received symbol sequence at the detected timing, and performing Walsh WFT conversion of the received symbol sequence to convert it to a wave-number spectrum;

an eighth step of combining the wave-number spectra specific to the symbol of the transmission-symbol sequence and the mobile station for each mobile station and symbol; and a ninth step of decoding the data from the combined signals of each symbol.

* * * * *